(12) United States Patent
Li et al.

(10) Patent No.: US 12,044,827 B2
(45) Date of Patent: Jul. 23, 2024

(54) OPTICAL IMAGING LENS ASSEMBLY

(71) Applicant: Zhejiang Sunny Optics Co., Ltd, Yuyao (CN)

(72) Inventors: Yanping Li, Yuyao (CN); Lingbo He, Yuyao (CN); Jianjun Li, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 790 days.

(21) Appl. No.: 17/148,260

(22) Filed: Jan. 13, 2021

(65) Prior Publication Data
US 2021/0263284 A1 Aug. 26, 2021

(30) Foreign Application Priority Data

Feb. 21, 2020 (CN) .......................... 202010108198.0

(51) Int. Cl.
| | |
|---|---|
| *G02B 13/00* | (2006.01) |
| *G02B 9/62* | (2006.01) |
| *G02B 13/02* | (2006.01) |
| *G02B 27/00* | (2006.01) |

(52) U.S. Cl.
CPC .......... *G02B 13/0045* (2013.01); *G02B 9/62* (2013.01); *G02B 13/02* (2013.01); *G02B 27/0025* (2013.01)

(58) Field of Classification Search
CPC ........ G02B 13/02; G02B 13/18; G02B 13/16; G02B 13/0015; G02B 13/0045; G02B 27/0172; G02B 27/0025; G02B 15/146; G02B 9/62; G02B 9/64; H04N 5/2254; H04N 5/222

USPC ......... 359/656–658, 708, 713, 749, 756–762
See application file for complete search history.

(56) References Cited

U.S. PATENT DOCUMENTS

| | | | |
|---|---|---|---|
| 6,181,488 B1* | 1/2001 | Yoneyama | G02B 13/24 359/759 |
| 10,698,178 B2 | 6/2020 | Kuo | |
| 2013/0016278 A1* | 1/2013 | Matsusaka | G02B 13/0045 359/713 |
| 2015/0116843 A1* | 4/2015 | Jo | G02B 9/62 359/713 |
| 2016/0054543 A1* | 2/2016 | Nabeta | G02B 9/62 359/713 |
| 2018/0024326 A1* | 1/2018 | Teraoka | G02B 9/62 359/713 |
| 2019/0369358 A1* | 12/2019 | Jung | G02B 13/02 |
| 2020/0049948 A1* | 2/2020 | Kuo | G02B 27/0037 |

OTHER PUBLICATIONS

India First Examination Report for Application No. 202114001697, dated Feb. 10, 2022, 6 pages.

* cited by examiner

*Primary Examiner* — Travis S Fissel
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens, a second lens, a third lens, a fourth lens, a fifth lens and a sixth lens. Each of the first to the sixth lenses has reactive power. The second lens has positive refractive power. An image-side surface of the fourth lens is concave. A radius of curvature R2 of an image-side surface of the first lens, a radius of curvature R5 of an object-side surface of the third lens and an effective focal length f3 of the third lens satisfy: $2.5<(R2+R5)/f3<11.0$.

18 Claims, 14 Drawing Sheets

OPTICAL IMAGING LENS ASSEMBLY

CROSS-REFERENCE TO RELATED APPLICATION

This application claims benefit of priority to Chinese Patent Application No. 202010108198.0 filed on Feb. 21, 2020 before the China National Intellectual Property Administration, the entire disclosure of which is incorporated herein by reference in its entity.

TECHNICAL FIELD

The present disclosure relates to an optical imaging lens assembly, and more specifically, relates to an optical imaging lens assembly including six lenses.

BACKGROUND

As a member of the multi-camera imaging lens assembly in current mobile phone camera, the telephoto lens assembly has become a necessary tool for the vast number of photographers who like to shoot people, wild animals, the moon, etc. because of its unique features: 1) it may zoom in on the object to make the picture clear and remove unwanted contents from the picture; 2) it may shorten the space distance between the distant scenes and the near scenes, and shoot the distant scenes into a compact picture to achieve the effect of compressing the space; and 3) it may achieve background blur.

With the continuous development of the portable electronic products, such as smart phones, people have also put forward higher requirements for the performance of the optical imaging lens assemblies applicable to the phones. The optical imaging assembly is assembled by a plurality of lenses, which offers more design freedoms and thus provides greater possibilities for improving the performance of the mobile phones. How to ensure miniaturization and better image quality while achieving the above-mentioned characteristics of the telephoto lens assembly brings new challenges to the design in this field.

SUMMARY

The present disclosure provides an optical imaging lens assembly, such as a telephoto optical imaging lens assembly, that is applicable to portable electronic products and at least solves or partially addresses at least one of the above disadvantages of the prior art.

The present disclosure provides an optical imaging lens assembly which includes, sequentially from an object side to an image side along an optical axis, a first lens, a second lens, a third lens, a fourth lens, a fifth lens and a sixth lens. Each of the first to the sixth lenses may have refractive power. An image-side surface of the fourth lens may be concave.

In one embodiment, a radius of curvature R2 of an image-side surface of the first lens, a radius of curvature R5 of an object-side surface of the third lens and an effective focal length f3 of the third lens may satisfy: $2.5<(R2+R5)/f3<11.0$.

In one embodiment, a distance TTL along the optical axis from an object-side surface of the first lens to an imaging plane of the optical imaging lens assembly and a total effective focal length f of the optical imaging lens assembly may satisfy: $TTL/f<1$.

In one embodiment, half of a maximum field-of-view Semi-Fov of the optical imaging lens assembly and an effective focal length f1 of the first lens may satisfy: $1.0 \text{ mm}<\tan(\text{Semi-Fov})*f1<1.6 \text{ mm}$.

In one embodiment, the second lens may have positive refractive power, an object-side surface thereof may be convex, and an image-side surface thereof may be concave.

In one embodiment, a total effective focal length f of the optical imaging lens assembly and a radius of curvature R1 of an object-side surface of the first lens may satisfy: $3.0<f/R1<4.0$.

In one embodiment, a radius of curvature R8 of the image-side surface of the fourth lens, a radius of curvature R10 of an image-side surface of the fifth lens and a total effective focal length f of the optical imaging lens assembly may satisfy: $1.0<(R8+R10)/f<2.0$.

In one embodiment, a center thickness CT1 of the first lens along the optical axis and a center thickness CT6 of the sixth lens along the optical axis may satisfy: $1.0<CT1/CT6<3.0$.

In one embodiment, an air interval T34 between the third lens and the fourth lens along the optical axis and an air interval T45 between the fourth lens and the fifth lens along the optical axis may satisfy: $1.5<T45/T34<4.5$.

In one embodiment, a center thickness CT5 of the fifth lens along the optical axis and an air interval T56 between the fifth lens and the sixth lens along the optical axis may satisfy: $0.5<T56/CT5<2.5$.

In one embodiment, an effective focal length f2 of the second lens, a radius of curvature R3 of an object-side surface of the second lens and a radius of curvature R9 of an object-side surface of the fifth lens may satisfy: $1.5<f2/(|R3+R9|)<4.0$.

In one embodiment, an object-side surface of the first lens may be convex, and an image-side surface of the first lens may be convex.

In one embodiment, an object-side surface of the sixth lens may be convex, and an image-side surface of the sixth lens may be concave.

The present disclosure employs six lenses. The above optical imaging lens assembly has at least one beneficial effect, such as telephoto, high image quality, and miniaturization and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
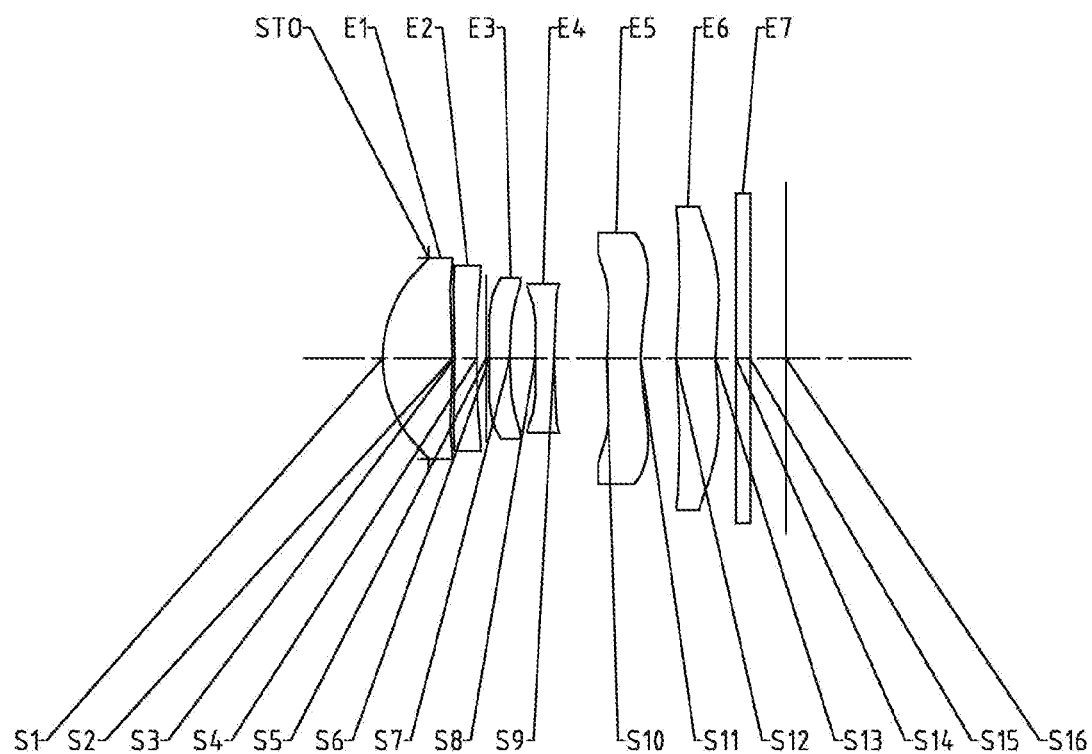
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses having refractive power, that is, a first lens, a second lens, a third lens, a fourth lens, a fifth lens and a sixth lens. The six lenses are arranged sequentially from an object side to an image side along an optical axis. Among the first lens to the sixth lens, there may be an air interval between each two adjacent lenses.

In an exemplary embodiment, the first lens has positive or negative refractive power; the second lens has positive or negative refractive power; the third lens has positive or negative refractive power; the fourth lens has positive or negative refractive power, and an image-side surface thereof may be concave; the fifth lens has positive or negative refractive power; and the sixth lens has positive or negative refractive power. By configuring the first lens and the second lens to have refractive power, it is beneficial to increase the field-of-view. At the same time, it is beneficial to compress the incident angle of the light at the position of the stop, reduce pupil aberration, and thereby improving the image quality. By configuring the third lens to have refractive power, it is beneficial to reduce the spherical aberration and astigmatic of the optical imaging lens assembly. By configuring the fourth lens to have refractive power and a concave image-side surface, it is beneficial to ensure the compact optical imaging lens assembly to achieve good image quality and has loose processing errors. By configuring the fifth lens and the sixth lens to have refractive power, the contribution of the spherical aberration of the fifth lens and the sixth lens may be reasonably controlled within a reasonable level, so that the on-axis field-of-view may obtain good image quality.

In an exemplary embodiment, the second lens has positive refractive power, an object-side surface thereof is convex, and an image-side surface thereof is concave. By limiting the refractive power of the second lens and the radii of curvature of the object-side surface and the image-side surface of the second lens, it is beneficial to reduce the spherical aberration and astigmatic of the optical imaging lens assembly.

In an exemplary embodiment, an object-side surface of the first lens is convex, and an image-side surface of the first lens is convex. By limiting the object-side surface and image-side surface of the first lens, it is beneficial to increase the field-of-view. At the same time, it is beneficial to compress the incident angle of the light at the position of the stop, reduce pupil aberration, and thereby improving the image quality.

In an exemplary embodiment, an object-side surface of the sixth lens is convex, and an image-side surface of the sixth lens is concave. By limiting the object-side surface and the image-side surface of the sixth lens, it is beneficial to achieve a compact optical lens assembly structure with a long back focus.

In an exemplary embodiment, the optical imaging lens assembly according to the present disclosure may satisfy: $2.5<(R2+R5)/f3<11.0$, where R2 is a radius of curvature of an image-side surface of the first lens, R5 is a radius of curvature of an object-side surface of the third lens, and f3 is an effective focal length of the third lens. More specifically, R2, R5 and f3 may further satisfy: $2.66 \leq (R2+R5)/f3 \leq 10.66$. Satisfying the conditional expression $2.5<(R2+R5)/f3<11.0$ may effectively correct the astigmatic of the optical imaging lens assembly, thereby ensuring the image quality at the edge field-of-view. Optionally, the object-side surface of the third lens may be concave. Optionally, the third lens may have negative refractive power.

In an exemplary embodiment, the optical imaging lens assembly according to the present disclosure may satisfy: $TTL/f<1$, where TTL is a distance along the optical axis from an object-side surface of the first lens to an imaging plane of the optical imaging lens assembly, and f is a total effective focal length of the optical imaging lens assembly. More specifically, TTL and f may further satisfy: $0.8<TTL/f<1$, for example, $0.89<TTL/f<0.98$. By controlling the ratio of the on-axis distance from the object-side surface of the first lens to the imaging plane to the total effective focal length of the optical imaging lens assembly, the telephoto characteristics of the optical imaging lens assembly may be effectively ensured, so as to achieve the effects of zooming in on the subject, blurring the background, etc., and achieve the effect of space compression.

In an exemplary embodiment, the optical imaging lens assembly according to the present disclosure may satisfy: $1.0 \text{ mm}<\tan(\text{Semi-Fov})*f1<1.6 \text{ mm}$, where Semi-Fov is half of a maximum field-of-view of the optical imaging lens assembly, and f1 is an effective focal length of the first lens. More specifically, Semi-Fov and f1 may further satisfy: $1.22 \text{ mm} \leq \tan(\text{Semi-Fov})*f1 \leq 1.50 \text{ mm}$. By controlling the maximum field-of-view of the optical imaging lens assembly and the effective focal length of the first lens, the optical imaging lens assembly may have a suitable field-of-view to meet the conventional shooting needs. Optionally, the first lens may have positive refractive power.

In an exemplary embodiment, the optical imaging lens assembly according to the present disclosure may satisfy: $3.0<f/R1<4.0$, where f is a total effective focal length of the optical imaging lens assembly, and R1 is a radius of curvature of an object-side surface of the first lens. More specifically, f and R1 may further satisfy: $3.08 \leq f/R1 \leq 3.83$. By controlling the ratio of the total effective focal length of the optical imaging lens assembly to the radius of curvature of the object-side surface of the first lens, the size of the aperture of the first lens may be effectively controlled, thereby controlling the light flux of the optical system within a reasonable range.

In an exemplary embodiment, the optical imaging lens assembly according to the present disclosure may satisfy: $1.0<(R8+R10)/f<2.0$, where R8 is a radius of curvature of the image-side surface of the fourth lens, R10 is a radius of curvature of an image-side surface of the fifth lens, and f is a total effective focal length of the optical imaging lens assembly. More specifically, R8, R10 and f may further satisfy: $1.22 \leq (R8+R10)/f \leq 1.94$. By satisfying the conditional expression $1.0<(R8+R10)/f<2.0$, the astigmatic of the optical imaging lens assembly may be effectively corrected, thereby ensuring the image quality at the edge field-of-view. Optionally, the image-side surface of the fifth lens may be concave.

In an exemplary embodiment, the optical imaging lens assembly according to the present disclosure may satisfy: $1.0<CT1/CT6<3.0$, where CT1 is a center thickness of the first lens along the optical axis, and CT6 is a center thickness of the sixth lens along the optical axis. More specifically, CT1 and CT6 may further satisfy: $1.26 \leq CT1/CT6 \leq 2.51$. By controlling the ratio of the center thickness of the first lens along the optical axis to the center thickness of the sixth lens along the optical axis, the shapes and thicknesses of the first and the sixth lenses may be effectively restricted, so that the thickness of each lens is uniform, thereby facilitating molding and processing.

In an exemplary embodiment, the optical imaging lens assembly according to the present disclosure may satisfy: $1.5<T45/T34<4.5$, where T34 is an air interval between the third lens and the fourth lens along the optical axis, and T45 is an air interval between the fourth lens and the fifth lens along the optical axis. More specifically, T45 and T34 may further satisfy: $1.92 \leq T45/T34 \leq 4.21$. By controlling the air interval between the third lens and the fourth lens along the optical axis and the air interval between the fourth lens and the fifth lens along the optical axis, the thicknesses and positions of the third, the fourth and the fifth lenses may be effectively restricted, so that the thickness of each lens is uniform, and the structure arrangement is uniform, thereby facilitating the molding and assembly.

In an exemplary embodiment, the optical imaging lens assembly according to the present disclosure may satisfy: 0.5<T56/CT5<2.5, where CT5 is a center thickness of the fifth lens along the optical axis, and T56 is an air interval between the fifth lens and the sixth lens along the optical axis. More specifically, T56 and CT5 may further satisfy: 0.5<T56/CT5<2.1, for example, 0.56≤T56/CT5≤2.08. Satisfying the conditional expression 0.5<T56/CT5<2.5 may effectively restrict the shape and thickness of the fifth lens, so that the thickness of the lens is uniform, thereby facilitating molding and processing.

In an exemplary embodiment, the optical imaging lens assembly according to the present disclosure may satisfy: 1.5<f2/(|R3+R9|)<4.0, where f2 is an effective focal length of the second lens, R3 is a radius of curvature of an object-side surface of the second lens, and R9 is a radius of curvature of an object-side surface of the fifth lens. More specifically, f2, R3 and R9 may further satisfy: 1.98≤f2/(|R3+R9|)≤3.99. Satisfying the conditional expression 1.5<f2/(|R3+R9|)<4.0, the coma generated by the lenses on the front end may be well compensated, thereby obtaining good image quality.

In an exemplary embodiment, the above optical imaging lens assembly may further include a stop to improve image quality. Optionally, the stop may be disposed between the object side and the first lens to limit the aperture of the light beam. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the imaging lens assembly may be reduced, and the workability of the imaging lens assembly may be improved, such that the optical imaging lens assembly is more advantageous for production processing and may be applied to portable electronic products. The present disclosure proposes a solution for a six-piece optical imaging lens assembly, which has the characteristics of telephoto, high image quality and miniaturization, and may match high-pixel sensors and strong image processing technology.

In the embodiments of the present disclosure, at least one of the surfaces of lenses is aspheric, that is, at least one of the object-side surface and the image-side surface of each of the first lens, the second lens, the third lens, the fourth lens, the fifth lens and the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 shows a schematic structural view of the optical imaging lens assembly according to example 1 of the present disclosure.

As shown in FIG. 1, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has positive refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 1 is a table illustrating basic parameters of the optical imaging lens assembly of example 1, wherein the units for the radius of curvature, the thickness and the focal length are millimeter (mm).

TABLE 1

Example 1: f = 6.10 mm, TTL = 5.99 mm, ImgH = 2.60 mm, Semi-Fov = 22.9°, Fno = 2.04

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6848 | | | | |
| S1 | Aspheric | 1.9062 | 1.0357 | 1.55 | 56.1 | 3.24 | −3.4310 |
| S2 | Aspheric | −19.5497 | 0.0300 | | | | 50.0000 |
| S3 | Aspheric | 40.4428 | 0.3300 | 1.68 | 19.2 | 100.00 | −99.0000 |
| S4 | Aspheric | 100.0000 | 0.1399 | | | | −99.0000 |
| S5 | Spherical | Infinite | 0.0521 | | | | |
| S6 | Aspheric | −3.7312 | 0.3005 | 1.55 | 56.1 | −6.83 | −92.7156 |
| S7 | Aspheric | 33.2066 | 0.3759 | | | | 50.0000 |
| S8 | Aspheric | 11.3197 | 0.2790 | 1.68 | 19.2 | 22.84 | −47.2497 |
| S9 | Aspheric | 5.1933 | 0.7869 | | | | 18.4556 |
| S10 | Aspheric | 5.8259 | 0.5013 | 1.55 | 56.1 | −36.85 | 0.8788 |
| S11 | Aspheric | 2.9864 | 0.5211 | | | | −3.7490 |
| S12 | Aspheric | 3.9688 | 0.5876 | 1.68 | 19.2 | 239.70 | −2.7115 |
| S13 | Aspheric | 3.8435 | 0.3023 | | | | −17.0112 |
| S14 | Spherical | Infinite | 0.2100 | 1.52 | 64.2 | | |
| S15 | Spherical | Infinite | 0.5343 | | | | |
| S16 | Spherical | Infinite | | | | | |

Where, f is a total effective focal length of the optical imaging lens assembly, TTL is a distance along the optical axis from the object-side surface S1 of the first lens E1 to the imaging plane S16 of the optical imaging lens assembly, ImgH is half of a diagonal length of an effective pixel area on the imaging plane S16, Semi-Fov is half of a maximum field-of-view of the optical imaging lens assembly, and Fno is an aperture number of the optical imaging lens assembly.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S4, and S6 to S13 in example 1.

TABLE 2

| Surface number | A4 | A6 | A8 |
|---|---|---|---|
| S1 | 5.8559E−02 | −1.7498E−02 | 2.0280E−02 |
| S2 | −1.8307E−01 | 6.1957E−01 | −1.1906E+00 |
| S3 | −1.7548E−01 | 5.3909E−01 | −1.1090E+00 |
| S4 | 1.0375E−01 | −7.0960E−02 | −3.1180E−01 |
| S6 | 3.3234E−01 | −4.0188E−01 | 6.7934E−02 |
| S7 | 3.7861E−01 | −8.6052E−01 | 1.6037E+00 |
| S8 | −9.2863E−02 | −2.6836E−01 | 7.5243E−01 |
| S9 | −1.1227E−01 | −6.7749E−02 | 1.9183E−01 |
| S10 | −7.0036E−02 | −2.0650E−02 | 7.1521E−02 |
| S11 | −8.6321E−02 | 6.1914E−02 | −4.5190E−02 |
| S12 | −1.1374E−01 | 5.1748E−02 | 1.4125E−03 |
| S13 | −8.8067E−02 | 3.2314E−02 | −4.5796E−03 |

| Surface number | A10 | A12 | A14 |
|---|---|---|---|
| S1 | −2.1356E−02 | 1.5967E−02 | −7.0539E−03 |
| S2 | 1.6115E+00 | −1.5140E+00 | 9.5911E−01 |
| S3 | 1.5700E+00 | −1.5079E+00 | 9.6711E−01 |
| S4 | 8.0482E−01 | −9.1665E−01 | 6.1984E−01 |
| S6 | 5.6471E−01 | −8.0662E−01 | 5.3321E−01 |
| S7 | −2.7397E+00 | 4.1692E+00 | −4.7612E+00 |
| S8 | −1.7097E+00 | 3.1865E+00 | −4.0238E+00 |
| S9 | −1.5386E−01 | 1.0492E−01 | −5.1994E−02 |
| S10 | −1.4071E−01 | 1.5117E−01 | −8.9937E−02 |
| S11 | 1.0751E−02 | 7.2221E−03 | −6.3959E−03 |
| S12 | −1.5256E−02 | 8.0532E−03 | −1.9686E−03 |
| S13 | −1.4239E−03 | 6.2162E−04 | −7.0196E−05 |

| Surface number | A16 | A18 | A20 |
|---|---|---|---|
| S1 | 1.5656E−03 | −8.0141E−05 | −1.9842E−05 |
| S2 | −3.8908E−01 | 9.0873E−02 | −9.2543E−03 |
| S3 | −3.9591E−01 | 9.3245E−02 | −9.5743E−03 |
| S4 | −2.5859E−01 | 6.1379E−02 | −6.2765E−03 |
| S6 | −1.7112E−01 | 1.2609E−02 | 4.1870E−03 |
| S7 | 3.5909E+00 | −1.5620E+00 | 2.9143E−01 |
| S8 | 3.1961E+00 | −1.4583E+00 | 2.8955E−01 |
| S9 | 6.8558E−03 | 4.8549E−03 | −2.1088E−03 |
| S10 | 2.9965E−02 | −5.2165E−03 | 3.6809E−04 |
| S11 | 2.1102E−03 | −3.4123E−04 | 2.2495E−05 |
| S12 | 2.3842E−04 | −1.1259E−05 | −6.3441E−08 |
| S13 | 1.9795E−06 | 2.3810E−07 | 3.4104E−08 |

Figure 2A:
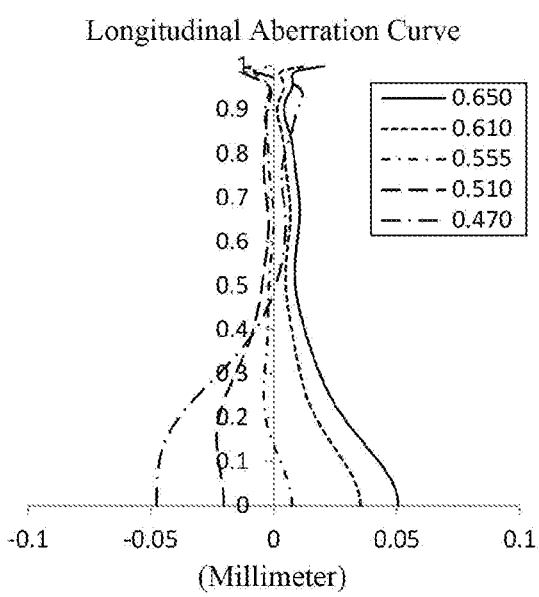
FIGS. 2A to 2C illustrate a longitudinal aberration curve, an astigmatic curve, and a distortion curve of the optical imaging lens assembly of the example 1, respectively.
Figure 2B:
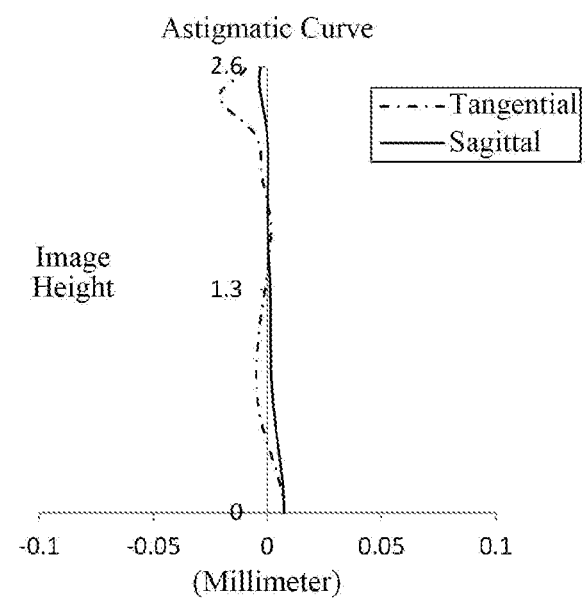
Figure 2C:
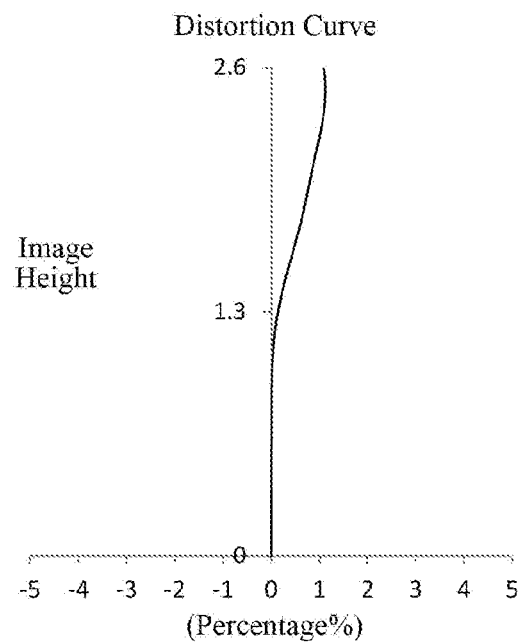

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. It can be seen from FIG. 2A to FIG. 2C that the optical imaging lens assembly provided in example 1 may achieve good image quality.

Example 2

Figure 3:
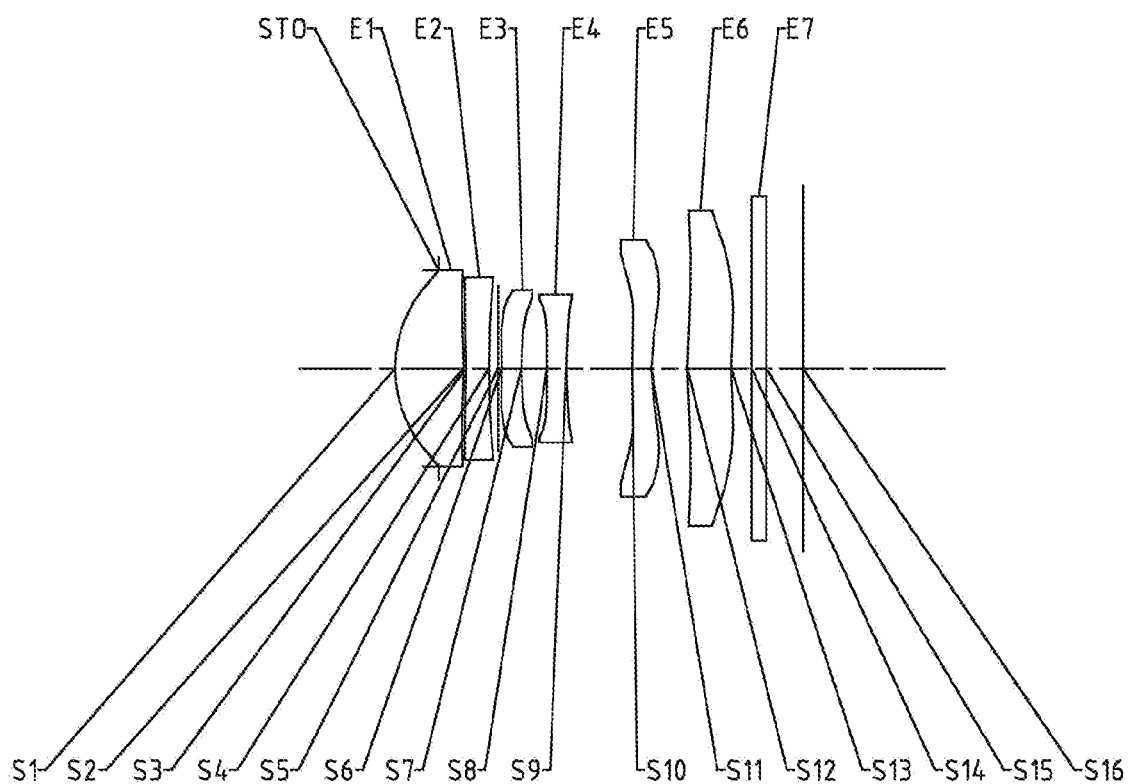
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 3 is a table illustrating basic parameters of the optical imaging lens assembly of example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

Example 2: f = 6.28 mm, TTL = 5.84 mm, ImgH = 2.60 mm, Semi-Fov = 22.4°, Fno = 2.25

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6227 | | | | |
| S1 | Aspheric | 1.7760 | 0.9849 | 1.55 | 56.1 | 3.18 | −3.1657 |
| S2 | Aspheric | −66.6667 | 0.0289 | | | | −99.0000 |
| S3 | Aspheric | 29.7715 | 0.3300 | 1.68 | 19.2 | 99.99 | −88.8120 |
| S4 | Aspheric | 52.8718 | 0.1321 | | | | −99.0000 |
| S5 | Spherical | Infinite | 0.0516 | | | | |
| S6 | Aspheric | −3.8715 | 0.2790 | 1.55 | 56.1 | −7.09 | −99.0000 |
| S7 | Aspheric | 33.0396 | 0.3656 | | | | −99.0000 |
| S8 | Aspheric | 12.7318 | 0.2790 | 1.68 | 19.2 | 27.02 | −98.7902 |
| S9 | Aspheric | 5.2501 | 0.9398 | | | | 19.3760 |
| S10 | Aspheric | 6.6205 | 0.2790 | 1.55 | 56.1 | −27.33 | 3.5002 |
| S11 | Aspheric | 2.7410 | 0.5137 | | | | −5.8452 |
| S12 | Aspheric | 5.0820 | 0.6246 | 1.68 | 19.2 | −19.15 | −0.1501 |
| S13 | Aspheric | 5.3090 | 0.2957 | | | | −18.6146 |
| S14 | Spherical | Infinite | 0.2100 | 1.52 | 64.2 | | |
| S15 | Spherical | Infinite | 0.5261 | | | | |
| S16 | Spherical | Infinite | | | | | |

TABLE 4

| Surface number | A4 | A6 | A8 |
|---|---|---|---|
| S1 | 6.9954E−02 | −4.3547E−02 | 1.1429E−01 |
| S2 | −4.1104E−01 | 1.6571E+00 | −3.7480E+00 |
| S3 | −4.0940E−01 | 1.6016E+00 | −3.6757E+00 |
| S4 | 2.5019E−02 | 2.8798E−01 | −1.1609E+00 |
| S6 | 3.4261E−01 | −2.8904E−01 | −4.6118E−01 |
| S7 | 4.2137E−01 | −8.4533E−01 | 1.0098E+00 |
| S8 | −4.1957E−02 | −4.8001E−01 | 1.5146E+00 |
| S9 | −4.9698E−02 | −1.8525E−01 | 4.2754E−01 |
| S10 | −8.6270E−02 | 1.4673E−02 | 1.1210E−02 |
| S11 | −9.2433E−02 | 8.2734E−02 | −8.3192E−02 |
| S12 | −9.8743E−02 | 5.1902E−02 | −1.1558E−02 |
| S13 | −8.8973E−02 | 3.8652E−02 | −1.5109E−02 |

| Surface number | A10 | A12 | A14 |
|---|---|---|---|
| S1 | −2.2129E−01 | 2.7327E−01 | −2.1042E−01 |
| S2 | 5.6436E+00 | −5.7480E+00 | 3.8939E+00 |
| S3 | 5.5768E+00 | −5.7182E+00 | 3.9173E+00 |
| S4 | 2.1147E+00 | −2.2917E+00 | 1.6061E+00 |
| S6 | 1.8161E+00 | −2.5345E+00 | 2.0087E+00 |
| S7 | −4.8963E−01 | −3.2438E−01 | 7.4720E−01 |
| S8 | −4.4544E+00 | 9.7846E+00 | −1.4005E+01 |
| S9 | −6.8118E−01 | 1.0677E+00 | −1.1951E+00 |
| S10 | −6.8984E−02 | 8.8641E−02 | −5.2344E−02 |
| S11 | 4.9292E−02 | −1.7793E−02 | 4.1413E−03 |
| S12 | 1.4688E−04 | −7.0647E−04 | 7.7721E−04 |
| S13 | 6.6280E−03 | −2.4467E−03 | 5.4755E−04 |

TABLE 4-continued

| Surface number | A16 | A18 | A20 |
|---|---|---|---|
| S1 | 9.7987E-02 | -2.5271E-02 | 2.7595E-03 |
| S2 | -1.6753E+00 | 4.1253E-01 | -4.4033E-02 |
| S3 | -1.7135E+00 | 4.3110E-01 | -4.7220E-02 |
| S4 | -7.2631E-01 | 1.9239E-01 | 2.2383E-02 |
| S6 | -9.1597E-01 | 2.0170E-01 | -1.0674E-02 |
| S7 | -5.0554E-01 | 1.4417E-01 | -2.3265E-02 |
| S8 | 1.2405E+01 | -6.2117E+00 | 1.3335E+00 |
| S9 | 8.2895E-01 | -3.2821E-01 | 5.6924E-02 |
| S10 | 1.6368E-02 | -2.6362E-03 | 1.7227E-04 |
| S11 | -6.2603E-04 | 5.2930E-05 | -1.4380E-06 |
| S12 | -2.4815E-04 | 3.4501E-05 | -1.8359E-06 |
| S13 | -6.1712E-05 | 2.4530E-06 | 3.1537E-08 |

Figure 4A:
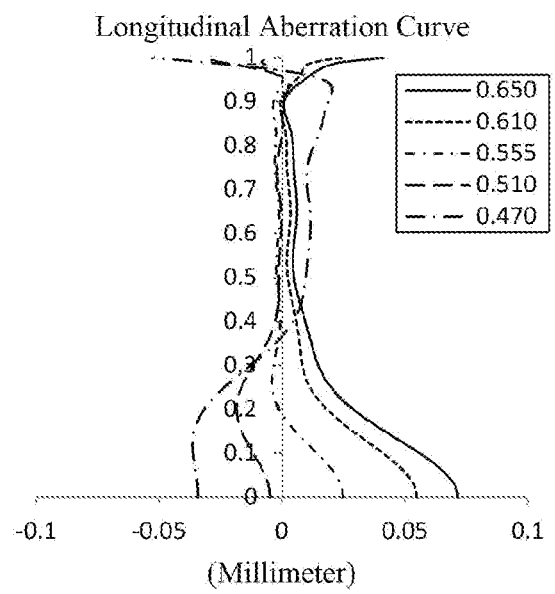
FIGS. 4A to 4C illustrate a longitudinal aberration curve, an astigmatic curve, and a distortion curve of the optical imaging lens assembly of the example 2, respectively.
Figure 4B:
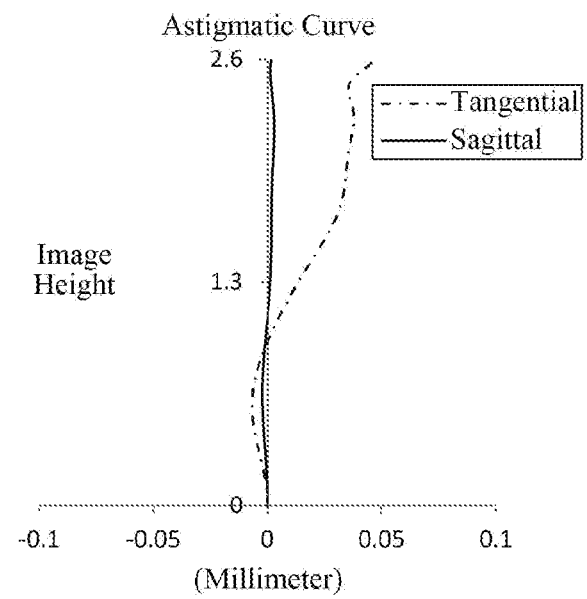
Figure 4C:
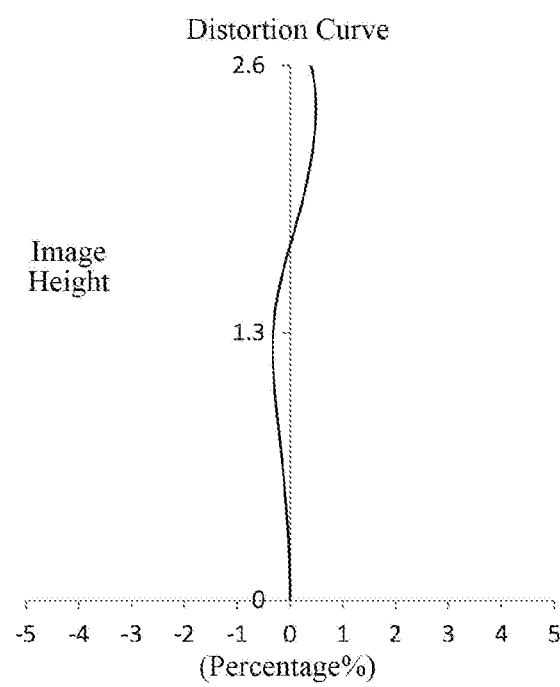

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. It can be seen from FIG. 4A to FIG. 4C that the optical imaging lens assembly provided in example 2 may achieve good image quality.

Example 3

Figure 5:
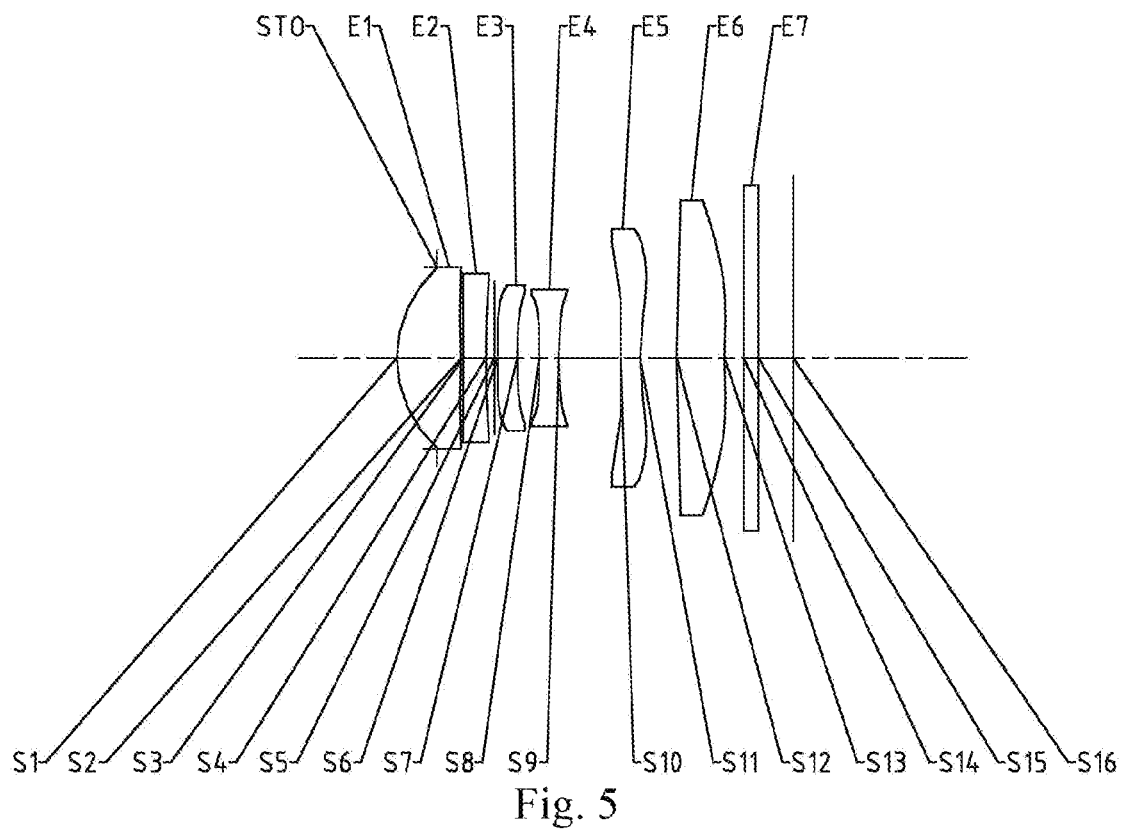
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 shows a schematic structural view of the optical imaging lens assembly according to example 3 of the present disclosure.

As shown in FIG. 5, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has negative refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 5 is a table illustrating basic parameters of the optical imaging lens assembly of example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: f = 6.40 mm, TTL = 5.72 mm, ImgH = 2.60 mm, Semi-Fov = 22.1°, Fno = 2.46

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | -0.5788 | | | | |
| S1 | Aspheric | 1.6712 | 0.9275 | 1.55 | 56.1 | 3.00 | -2.9403 |
| S2 | Aspheric | -64.5704 | 0.0303 | | | | -37.8763 |
| S3 | Aspheric | 20.8538 | 0.3300 | 1.68 | 19.2 | 98.79 | 49.3094 |
| S4 | Aspheric | 30.0973 | 0.1200 | | | | -99.0000 |
| S5 | Spherical | Infinite | 0.0508 | | | | |
| S6 | Aspheric | -4.2021 | 0.2790 | 1.55 | 56.1 | -7.70 | -98.7487 |
| S7 | Aspheric | 110.6004 | 0.3179 | | | | -99.0000 |
| S8 | Aspheric | 234.0640 | 0.2790 | 1.68 | 19.2 | -490.94 | 50.0000 |
| S9 | Aspheric | 4.7037 | 0.8967 | | | | 17.7559 |
| S10 | Aspheric | 11.7089 | 0.2790 | 1.55 | 56.1 | -10.94 | 28.4236 |
| S11 | Aspheric | 3.1581 | 0.5243 | | | | -6.3439 |
| S12 | Aspheric | 7.7656 | 0.6945 | 1.68 | 19.2 | -12.87 | 6.6350 |
| S13 | Aspheric | 9.1250 | 0.2746 | | | | -26.3478 |
| S14 | Spherical | Infinite | 0.2100 | 1.52 | 64.2 | | |
| S15 | Spherical | Infinite | 0.5053 | | | | |
| S16 | Spherical | Infinite | | | | | |

TABLE 6

| Surface number | A4 | A6 | A8 |
|---|---|---|---|
| S1 | 7.8474E−02 | −5.0377E−02 | 1.6484E−01 |
| S2 | −5.1426E−01 | 2.7690E+00 | −8.1069E+00 |
| S3 | −5.5061E−01 | 2.7874E+00 | −8.1335E+00 |
| S4 | −8.1449E−02 | 8.7406E−01 | −3.0324E+00 |
| S6 | 2.9717E−01 | 2.0857E−01 | −2.5915E+00 |
| S7 | 3.8668E−01 | −5.1595E−01 | −8.2652E−01 |
| S8 | −4.8907E−02 | −5.0562E−01 | 1.7263E+00 |
| S9 | −2.8240E−02 | −1.5356E−01 | 4.2576E−01 |
| S10 | −8.3633E−02 | 2.8065E−02 | −2.9802E−02 |
| S11 | −7.8305E−02 | 4.5616E−02 | −3.4752E−02 |
| S12 | −6.6428E−02 | 3.3329E−02 | −1.3324E−02 |
| S13 | −7.5016E−02 | 3.1390E−02 | −1.8379E−02 |

| Surface number | A10 | A12 | A14 |
|---|---|---|---|
| S1 | −3.7817E−01 | 5.4463E−01 | −4.8650E−01 |
| S2 | 1.5561E+01 | −2.0129E+01 | 1.7312E+01 |
| S3 | 1.5555E+01 | −2.0124E+01 | 1.7441E+01 |
| S4 | 5.9446E+00 | −7.5527E+00 | 6.5657E+00 |
| S6 | 7.5454E+00 | −1.2736E+01 | 1.4092E+01 |
| S7 | 5.2734E+00 | −1.1338E+01 | 1.3521E+01 |
| S8 | −5.8409E+00 | 1.5412E+01 | −2.6442E+01 |
| S9 | −7.1846E−01 | 1.5770E+00 | −2.5271E+00 |
| S10 | 5.9752E−03 | 2.2595E−02 | −1.8599E−02 |
| S11 | 1.3936E−02 | −4.4714E−05 | −2.4545E−05 |
| S12 | 9.9884E−03 | −6.7978E−03 | 2.6354E−03 |
| S13 | 1.0860E−02 | −3.9111E−03 | 7.6862E−04 |

| Surface number | A16 | A18 | A20 |
|---|---|---|---|
| S1 | 2.6189E−01 | −7.7795E−02 | 9.7526E−03 |
| S2 | −9.4414E+00 | 2.9384E+00 | −3.9549E−01 |
| S3 | −9.6572E+00 | 3.0695E+00 | −4.2356E−01 |
| S4 | −3.8644E+00 | 1.3866E+00 | −2.2469E−01 |
| S6 | −1.0029E+01 | 4.0882E+00 | −7.0578E−01 |
| S7 | −8.5761E+00 | 1.9590E+00 | 2.4406E−01 |
| S8 | 2.7816E+01 | −1.6630E+01 | 4.3305E+00 |
| S9 | 2.2781E+00 | −1.0830E+00 | 2.1141E−01 |
| S10 | 5.9639E−03 | −8.5461E−04 | 4.3438E−05 |
| S11 | 1.1084E−03 | −2.2315E−04 | 1.7690E−05 |
| S12 | −5.6639E−04 | 6.4140E−05 | −3.0171E−06 |
| S13 | −7.5298E−05 | 2.6800E−06 | 2.2734E−08 |

Figure 6A:
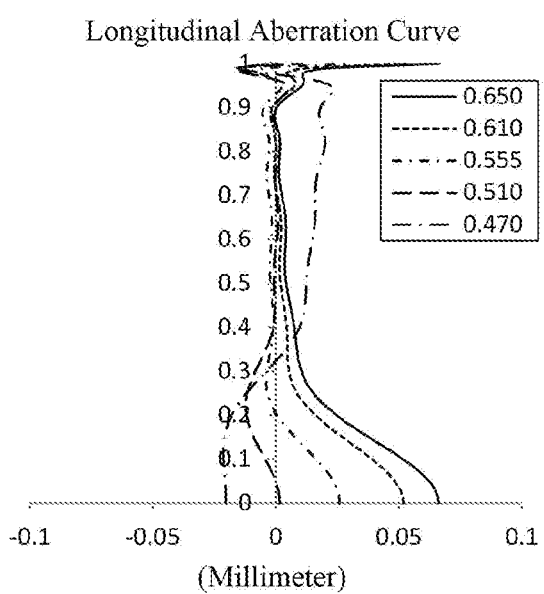
FIGS. 6A to 6C illustrate a longitudinal aberration curve, an astigmatic curve, and a distortion curve of the optical imaging lens assembly of the example 3, respectively.
Figure 6B:
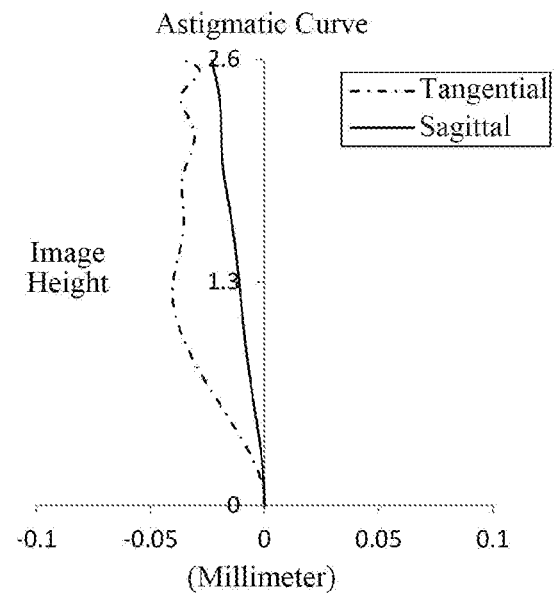
Figure 6C:
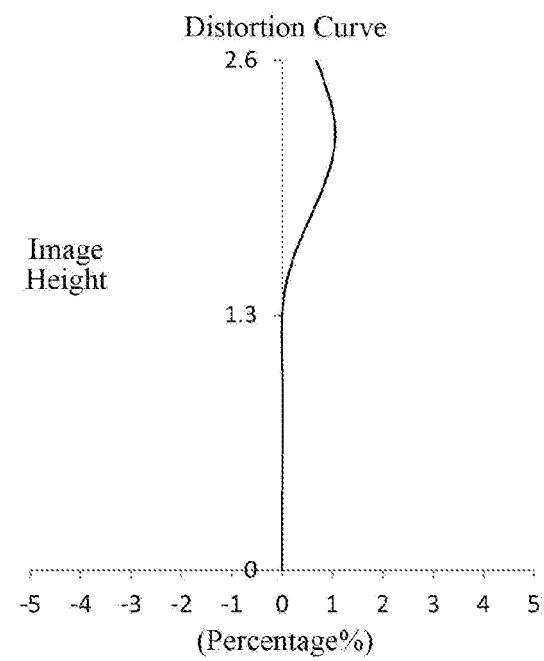

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. It can be seen from FIG. 6A to FIG. 6C that the optical imaging lens assembly provided in example 3 may achieve good image quality.

Example 4

Figure 7:
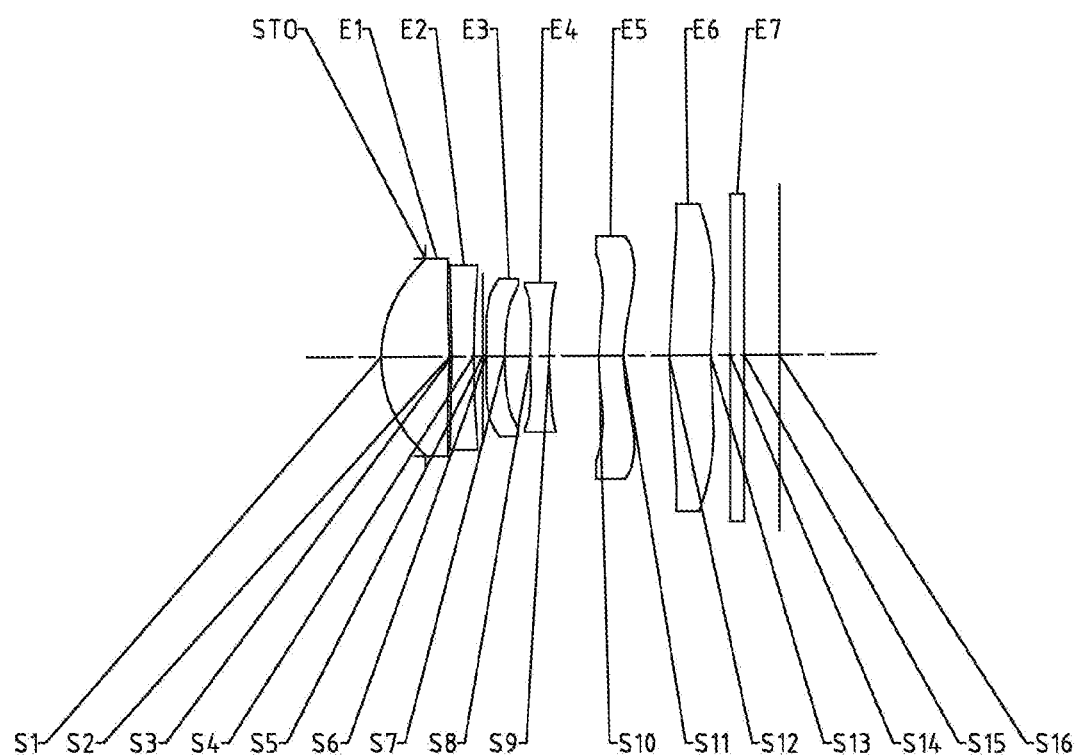
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 shows a schematic structural view of the optical imaging lens assembly according to example 4 of the present disclosure.

As shown in FIG. 7, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has positive refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 7 is a table illustrating basic parameters of the optical imaging lens assembly of example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: f = 6.10 mm, TTL = 5.99 mm, ImgH = 2.60 mm, Semi-Fov = 22.9°, Fno = 2.04

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.6626 | | | | |
| S1 | Aspheric | 1.9093 | 1.0334 | 1.55 | 56.1 | 3.39 | −3.5479 |
| S2 | Aspheric | −47.1435 | 0.0299 | | | | 12.7296 |
| S3 | Aspheric | 39.4428 | 0.3300 | 1.68 | 19.2 | 100.00 | −97.9442 |
| S4 | Aspheric | 94.0749 | 0.1365 | | | | 50.0000 |
| S5 | Spherical | Infinite | 0.0506 | | | | |
| S6 | Aspheric | −4.5241 | 0.2790 | 1.55 | 56.1 | −8.29 | −98.9951 |

TABLE 7-continued

Example 4: f = 6.10 mm, TTL = 5.99 mm, ImgH = 2.60 mm, Semi-Fov = 22.9°, Fno = 2.04

| Surface number | Surface type | Radius of curvature | Thickness | Material Refractive index | Abbe number | Focal length | Conic coefficient |
|---|---|---|---|---|---|---|---|
| S7 | Aspheric | 20.0470 | 0.3880 | | | | −98.4845 |
| S8 | Aspheric | 10.0639 | 0.2800 | 1.68 | 19.2 | 24.51 | 43.9658 |
| S9 | Aspheric | 5.1843 | 0.7443 | | | | 17.4074 |
| S10 | Aspheric | 3.3656 | 0.3684 | 1.55 | 56.1 | 21.14 | −2.7416 |
| S11 | Aspheric | 2.2782 | 0.6909 | | | | −3.3465 |
| S12 | Aspheric | 4.5641 | 0.6213 | 1.68 | 19.2 | −15.01 | −0.1415 |
| S13 | Aspheric | 4.0409 | 0.2961 | | | | −19.5565 |
| S14 | Spherical | Infinite | 0.2100 | 1.52 | 64.2 | | |
| S15 | Spherical | Infinite | 0.5278 | | | | |
| S16 | Spherical | Infinite | | | | | |

TABLE 8

| Surface number | A4 | A6 | A8 |
|---|---|---|---|
| S1 | 6.0489E−02 | −2.3449E−02 | 3.8006E−02 |
| S2 | −4.0536E−01 | 1.5271E+00 | −3.1828E+00 |
| S3 | −3.9970E−01 | 1.4921E+00 | −3.1909E+00 |
| S4 | 3.8627E−02 | 2.4332E−01 | −1.0493E+00 |
| S6 | 3.9134E−01 | −5.3318E−01 | 2.1039E−01 |
| S7 | 4.0228E−01 | −8.0781E−01 | 9.6627E−01 |
| S8 | −3.1538E−02 | −3.1655E−01 | 6.1378E−01 |
| S9 | −4.3918E−02 | −1.6462E−01 | 3.5561E−01 |
| S10 | −7.9841E−02 | 1.6886E−02 | −3.4387E−02 |
| S11 | −8.1713E−02 | 7.4122E−02 | −1.0223E−01 |
| S12 | −9.6370E−02 | 6.4802E−02 | −3.3322E−02 |
| S13 | −7.6625E−02 | 4.4228E−02 | −2.2907E−02 |

| Surface number | A10 | A12 | A14 |
|---|---|---|---|
| S1 | −5.8872E−02 | 6.3356E−02 | −4.3714E−02 |
| S2 | 4.3511E+00 | 4.0106E+00 | 2.4669E+00 |
| S3 | 4.4184E+00 | −4.0996E+00 | 2.5418E+00 |
| S4 | 1.8771E+00 | −1.9694E+00 | 1.3444E+00 |
| S6 | 4.6831E−01 | −7.7250E−01 | 6.0246E−01 |
| S7 | −4.9503E−01 | −4.0171E−01 | 1.2297E+00 |
| S8 | −1.0023E+00 | 1.2977E+00 | −8.7938E−01 |
| S9 | −5.6378E−01 | 8.7951E−01 | −9.6604E−01 |
| S10 | 2.5498E−02 | −3.7552E−03 | −2.1539E−03 |
| S11 | 8.9583E−02 | −5.0415E−02 | 1.8666E−02 |
| S12 | 1.4316E−02 | −5.0687E−03 | 1.3185E−03 |
| S13 | 9.3871E−03 | −2.6757E−03 | 4.7295E−04 |

| Surface number | A16 | A18 | A20 |
|---|---|---|---|
| S1 | 1.8444E−02 | −4.3306E−03 | 4.3058E−04 |
| S2 | −9.6724E−01 | 2.1746E−01 | −2.1203E−02 |
| S3 | −1.0094E+00 | 2.3108E−01 | −2.3054E−02 |
| S4 | −5.9993E−01 | 1.5909E−01 | −1.8809E−02 |
| S6 | −2.9148E−01 | 8.3102E−02 | −1.0464E−02 |
| S7 | −1.3112E+00 | 7.1548E−01 | −1.6785E−01 |
| S8 | 4.8717E−02 | 2.7118E−01 | −1.1283E−01 |
| S9 | 6.5259E−01 | −2.4961E−01 | 4.1127E−02 |
| S10 | 6.2065E−04 | 6.2196E−05 | −2.6482E−05 |
| S11 | 4.4317E−03 | 6.1078E−04 | −3.7183E−05 |
| S12 | −2.2280E−04 | 2.1429E−05 | −8.9212E−07 |
| S13 | −4.4848E−05 | 1.5937E−06 | 1.5940E−08 |

Figure 8A:
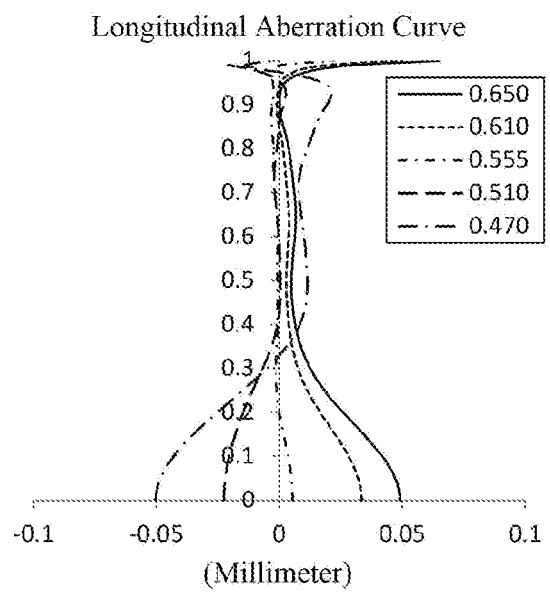
FIGS. 8A to 8C illustrate a longitudinal aberration curve, an astigmatic curve, and a distortion curve of the optical imaging lens assembly of the example 4, respectively.
Figure 8B:
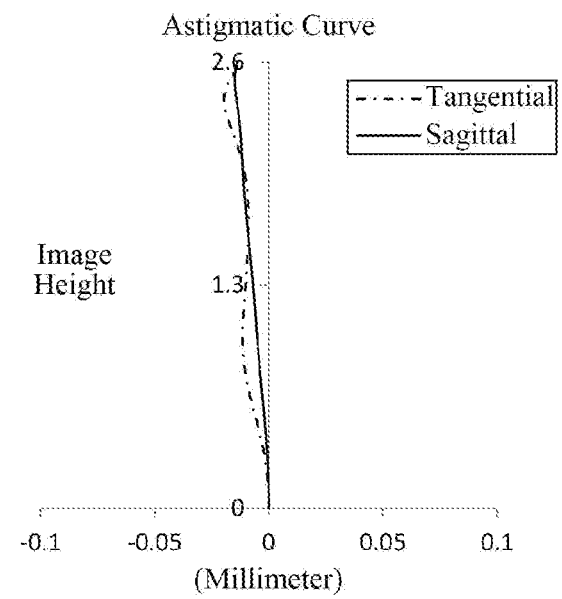
Figure 8C:
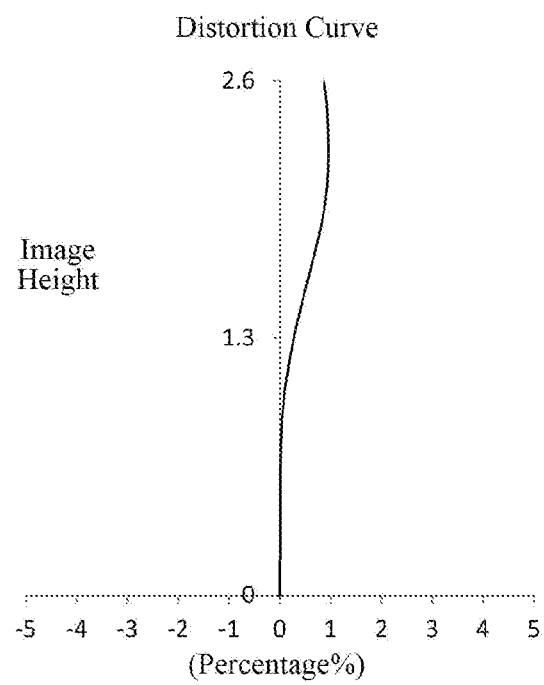

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. It can be seen from FIG. 8A to FIG. 8C that the optical imaging lens assembly provided in example 4 may achieve good image quality.

Example 5

Figure 9:
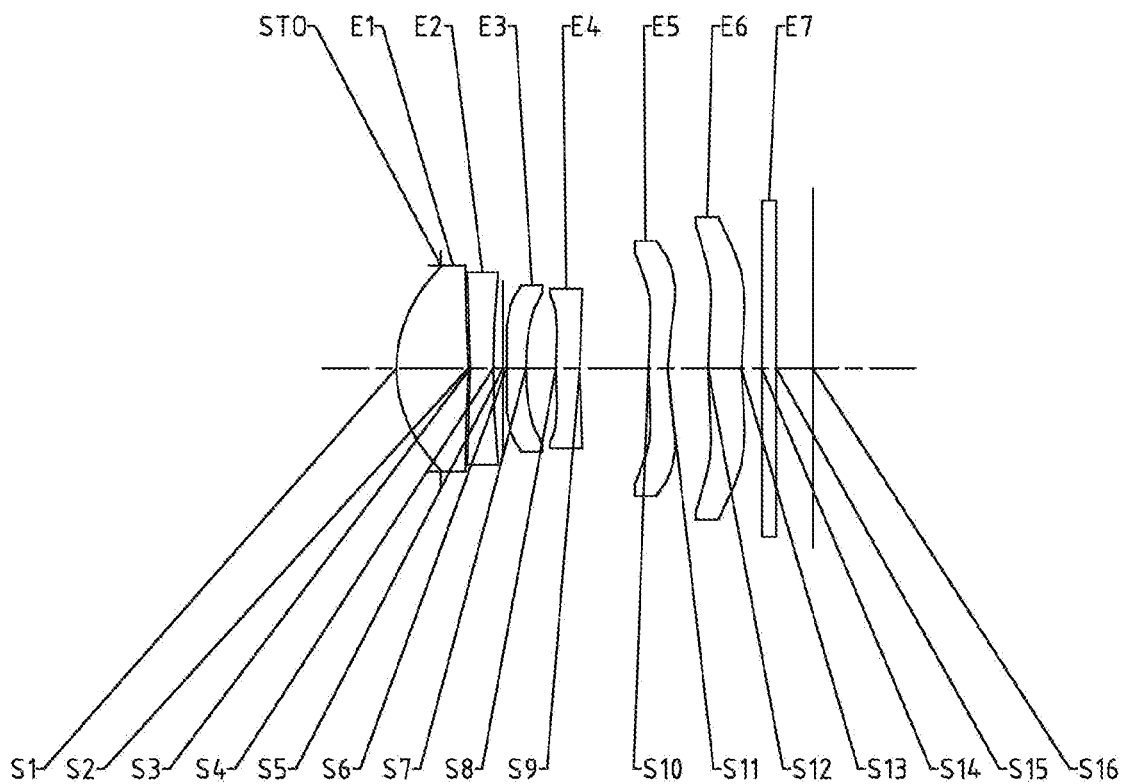
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 shows a schematic structural view of the optical imaging lens assembly according to example 5 of the present disclosure.

As shown in FIG. 9, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has positive refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 9 is a table illustrating basic parameters of the optical imaging lens assembly of example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

Example 5: f = 6.10 mm, TTL = 5.99 mm, ImgH = 2.60 mm, Semi-Fov = 22.9°, Fno = 2.04

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6416 | | | | |
| S1 | Aspheric | 1.9383 | 1.0334 | 1.55 | 56.1 | 3.43 | −3.7004 |
| S2 | Aspheric | −44.7512 | 0.0298 | | | | 50.0000 |
| S3 | Aspheric | 42.1555 | 0.3300 | 1.68 | 19.2 | 111.11 | −96.6165 |
| S4 | Aspheric | 95.4977 | 0.1402 | | | | −55.8800 |
| S5 | Spherical | Infinite | 0.0507 | | | | |
| S6 | Aspheric | −4.5845 | 0.2790 | 1.55 | 56.1 | −8.40 | −98.9645 |
| S7 | Aspheric | 8.2398 | 0.4293 | | | | −75.8165 |
| S8 | Aspheric | 6.3687 | 0.3409 | 1.68 | 19.2 | 23.17 | 24.3761 |
| S9 | Aspheric | 6.7377 | 0.9874 | | | | 17.7466 |
| S10 | Aspheric | 4.4779 | 0.2790 | 1.55 | 56.1 | 29.88 | −6.9238 |
| S11 | Aspheric | 2.4680 | 0.5792 | | | | −6.2136 |
| S12 | Aspheric | 4.1055 | 0.4813 | 1.68 | 19.2 | −28.55 | −8.0898 |
| S13 | Aspheric | 3.6982 | 0.2910 | | | | −30.8836 |
| S14 | Spherical | Infinite | 0.2100 | 1.52 | 64.2 | | |
| S15 | Spherical | Infinite | 0.5249 | | | | |
| S16 | Spherical | Infinite | | | | | |

TABLE 10

| Surface number | A4 | A6 | A8 |
|---|---|---|---|
| S1 | 5.8696E−02 | −1.9194E−02 | 2.1172E−02 |
| S2 | −4.6287E−01 | 1.7077E+00 | −3.5294E+00 |
| S3 | −4.4270E−01 | 1.6401E+00 | −3.4759E+00 |
| S4 | 5.3495E−02 | 2.1460E−01 | −9.2467E−01 |
| S6 | 3.8749E−01 | −5.6140E−01 | 4.8693E−01 |
| S7 | 3.6484E−01 | −7.5420E−01 | 1.1124E+00 |
| S8 | −8.1083E−02 | −1.8442E−01 | 3.3787E−01 |
| S9 | −5.2955E−02 | −9.5651E−02 | 2.1541E−01 |
| S10 | −9.5834E−02 | 3.6241E−02 | −5.6324E−02 |
| S11 | −9.4265E−02 | 7.9275E−02 | −9.7356E−02 |
| S12 | −1.1815E−01 | 7.6422E−02 | −4.2390E−02 |
| S13 | −7.0876E−02 | 1.6754E−02 | 3.5549E−03 |

| Surface number | A10 | A12 | A14 |
|---|---|---|---|
| S1 | −2.5314E−02 | 2.3340E−02 | −1.4366E−02 |
| S2 | 4.8052E+00 | 4.4119E+00 | 2.6992E+00 |
| S3 | 4.7836E+00 | −4.4140E+00 | 2.7149E+00 |
| S4 | 1.5843E+00 | −1.5842E+00 | 1.0218E+00 |
| S6 | −2.1286E−01 | 1.2496E−01 | −1.4637E−01 |
| S7 | −1.0848E+00 | 6.5298E−01 | −2.7820E−02 |
| S8 | −6.7829E−01 | 1.1440E+00 | −1.2624E+00 |
| S9 | −3.9332E−01 | 6.4172E−01 | −6.8440E−01 |
| S10 | 5.6739E−02 | −4.0276E−02 | 2.2955E−02 |
| S11 | 7.6904E−02 | −4.1112E−02 | 1.4999E−02 |
| S12 | 2.5177E−02 | −1.5027E−02 | 6.0863E−03 |
| S13 | −4.5972E−03 | 1.3665E−03 | −1.6505E−04 |

| Surface number | A16 | A18 | A20 |
|---|---|---|---|
| S1 | 5.5113E−03 | −1.1979E−03 | 1.0999E−04 |
| S2 | −1.0529E+00 | 2.3625E−01 | −2.3138E−02 |
| S3 | −1.0674E+00 | 2.4220E−01 | −2.4055E−02 |
| S4 | −4.2872E−01 | 1.0741E−01 | −1.2147E−02 |
| S6 | 1.0696E−01 | 4.0007E−02 | 6.3122E−03 |
| S7 | −2.9620E−01 | 2.1371E−01 | −5.3752E−02 |
| S8 | 8.5775E−01 | −3.2905E−01 | 5.1416E−02 |

TABLE 10-continued

| S9 | 4.5062E−01 | −1.6976E−01 | 2.8251E−02 |
|---|---|---|---|
| S10 | −8.8416E−03 | 1.8767E−03 | −1.6257E−04 |

TABLE 10-continued

| S11 | −3.4903E−03 | 4.5403E−04 | −2.4650E−05 |
|---|---|---|---|
| S12 | −1.4182E−03 | 1.7321E−04 | −8.6622E−06 |
| S13 | 7.7346E−06 | −2.5795E−07 | 1.9392E−08 |

Figures 10A, 10B:
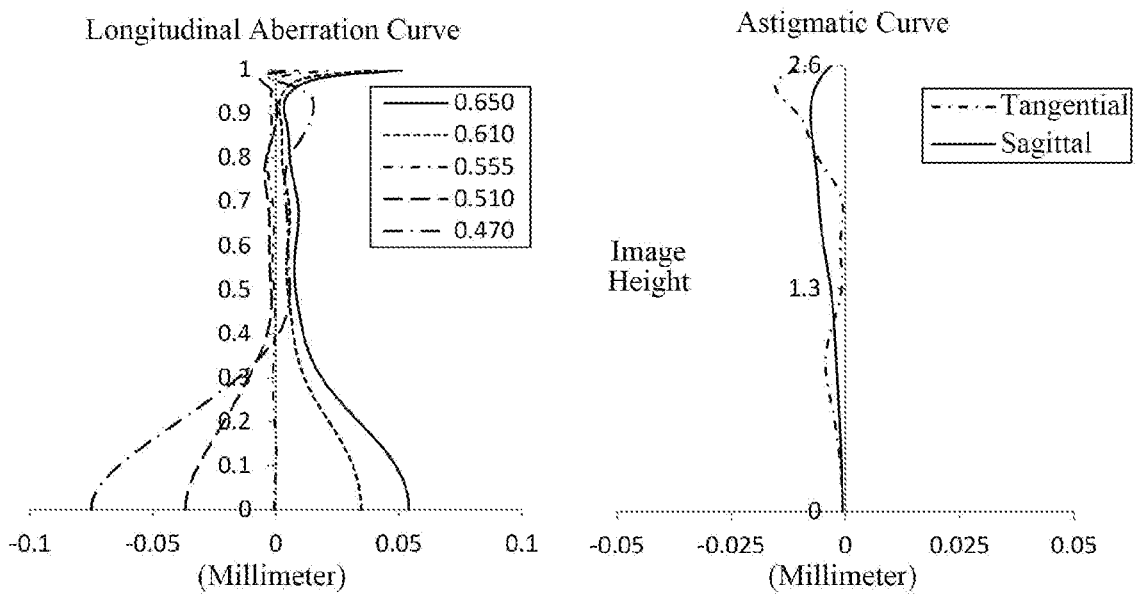
FIGS. 10A to 10C illustrate a longitudinal aberration curve, an astigmatic curve, and a distortion curve of the optical imaging lens assembly of the example 5, respectively.
Figure 10C:
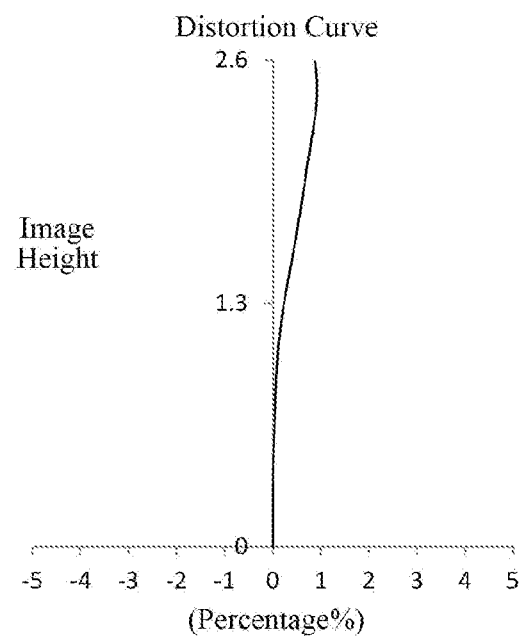

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. It can be seen from FIG. 10A to FIG. 10C that the optical imaging lens assembly provided in example 5 may achieve good image quality.

Example 6

Figure 11:
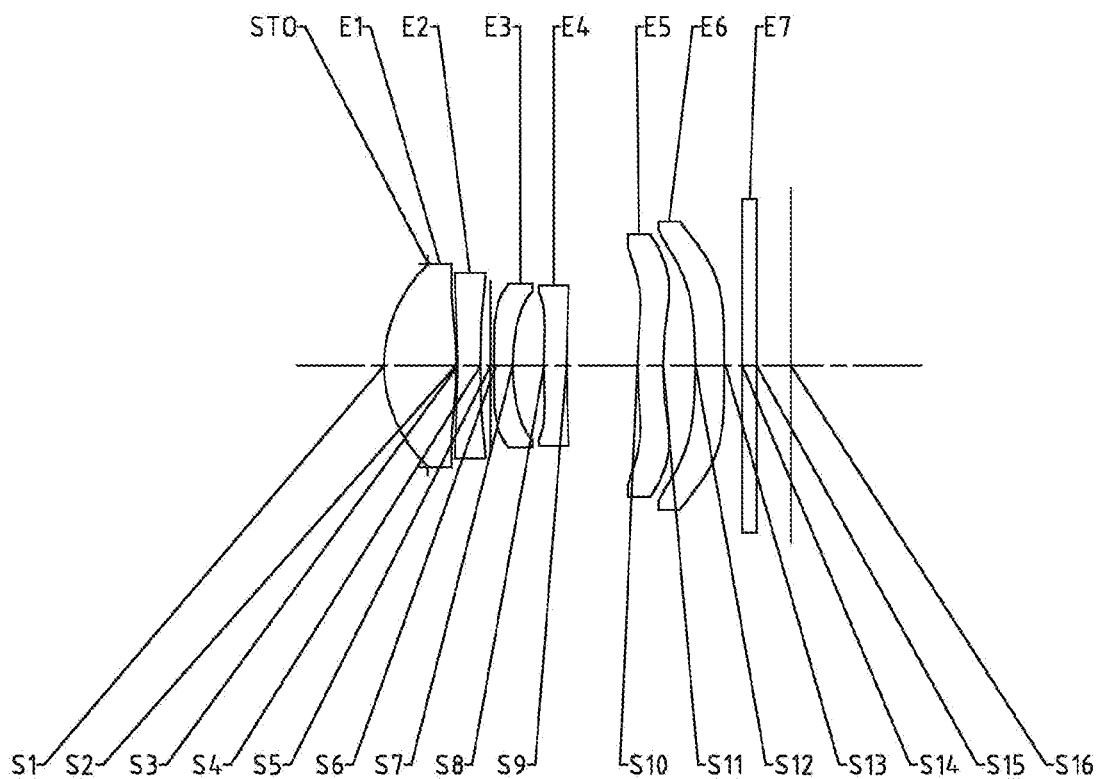
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 shows a schematic structural view of the optical imaging lens assembly according to example 6 of the present disclosure.

As shown in FIG. 11, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has negative refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has negative refractive power, an object-side surface S12 thereof is concave, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 11 is a table illustrating basic parameters of the optical imaging lens assembly of example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

Example 6: f = 6.10 mm, TTL = 5.99 mm, ImgH = 2.60 mm, Semi-Fov = 23.0°, Fno = 2.04

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6455 | | | | |
| S1 | Aspheric | 1.9714 | 1.0584 | 1.55 | 56.1 | 3.43 | −3.8340 |
| S2 | Aspheric | −29.8601 | 0.0300 | | | | 50.0000 |
| S3 | Aspheric | 38.1676 | 0.3300 | 1.68 | 19.2 | 90.91 | −99.0000 |
| S4 | Aspheric | 100.0000 | 0.1487 | | | | 50.0000 |
| S5 | Spherical | Infinite | 0.0482 | | | | |
| S6 | Aspheric | −7.7060 | 0.2790 | 1.55 | 56.1 | −14.12 | −49.9064 |
| S7 | Aspheric | 4.0065 | 0.4533 | | | | −85.7270 |
| S8 | Aspheric | 5.5181 | 0.3361 | 1.68 | 19.2 | −169.71 | 19.6113 |
| S9 | Aspheric | 5.9120 | 1.0397 | | | | 10.4239 |
| S10 | Aspheric | 5.3739 | 0.3830 | 1.55 | 56.1 | −1098.94 | 0.5268 |
| S11 | Aspheric | 5.9404 | 0.4766 | | | | 0.3185 |
| S12 | Aspheric | −7.2338 | 0.4215 | 1.68 | 19.2 | −5.27 | −99.0000 |
| S13 | Aspheric | 53.2288 | 0.2688 | | | | 50.0000 |
| S14 | Spherical | Infinite | 0.2100 | 1.52 | 64.2 | | |
| S15 | Spherical | Infinite | 0.5029 | | | | |
| S16 | Spherical | Infinite | | | | | |

TABLE 12

| Surface number | A4 | A6 | A8 |
|---|---|---|---|
| S1 | 5.8547E−02 | −2.3938E−02 | 3.2884E−02 |
| S2 | −4.5669E−01 | 1.5065E+00 | −2.9248E+00 |
| S3 | −4.2744E−01 | 1.3975E+00 | −2.7219E+00 |
| S4 | 4.4852E−02 | 1.0480E−01 | −4.4014E−01 |
| S6 | 3.5323E−01 | −5.8871E−01 | 8.0735E−01 |
| S7 | 3.7560E−01 | −8.1559E−01 | 1.3956E+00 |
| S8 | −1.2570E−01 | −6.6063E−02 | 4.2022E−02 |
| S9 | −9.0525E−02 | −3.4226E−02 | 1.3218E−01 |
| S10 | 1.2132E−02 | −9.6289E−02 | 4.1527E−02 |
| S11 | 8.6256E−02 | −1.5373E−01 | 9.8300E−02 |
| S12 | −6.2862E−03 | −6.8368E−02 | 9.6610E−02 |
| S13 | −3.3085E−02 | −4.4435E−02 | 5.5912E−02 |

TABLE 12-continued

| Surface number | A10 | A12 | A14 |
|---|---|---|---|
| S1 | −4.7398E−02 | 4.8538E−02 | −3.1672E−02 |
| S2 | 3.8561E+00 | −3.4928E+00 | 2.1295E+00 |
| S3 | 3.5959E+00 | 3.2833E+00 | 2.0305E+00 |
| S4 | 7.8493E−01 | −8.9615E−01 | 6.9136E−01 |
| S6 | −8.1331E−01 | 5.9202E−01 | −2.4200E−01 |
| S7 | −1.5302E+00 | 7.1881E−01 | 6.8857E−01 |
| S8 | 2.1235E−01 | −8.3694E−01 | 1.5393E+00 |
| S9 | −2.6731E−01 | 4.6434E−01 | −5.1899E−01 |
| S10 | 1.3422E−02 | −3.0992E−02 | 2.1117E−02 |
| S11 | −4.2740E−02 | 1.2783E−02 | −2.7246E−03 |
| S12 | −8.4581E−02 | 4.5165E−02 | −1.4554E−02 |
| S13 | −3.8691E−02 | 1.6025E−02 | −3.8279E−03 |

| Surface number | A16 | A18 | A20 |
|---|---|---|---|
| S1 | 1.2656E−02 | −2.8480E−03 | 2.8137E−04 |
| S2 | −8.3244E−01 | 1.8826E−01 | −1.8718E−02 |
| S3 | 8.0828E−01 | 1.8648E−01 | −1.8955E−02 |
| S4 | −3.3932E−01 | 9.3298E−02 | −1.0839E−02 |
| S6 | 2.2672E−02 | 1.8353E−02 | −5.2224E−03 |
| S7 | −1.3431E+00 | 8.6098E−01 | −2.0790E−01 |
| S8 | −1.5588E+00 | 8.3401E−01 | −1.8683E−01 |
| S9 | 3.5515E−01 | −1.3660E−01 | 2.2457E−02 |

TABLE 12-continued

| S10 | −7.3389E−03 | 1.2853E−03 | −8.9662E−05 |
| S11 | 5.1338E−04 | −8.5271E−05 | 7.1378E−06 |
| S12 | 2.7534E−03 | −2.7957E−04 | 1.1677E−05 |
| S13 | 4.8351E−04 | −2.4998E−05 | 2.2327E−08 |

Figure 12A:
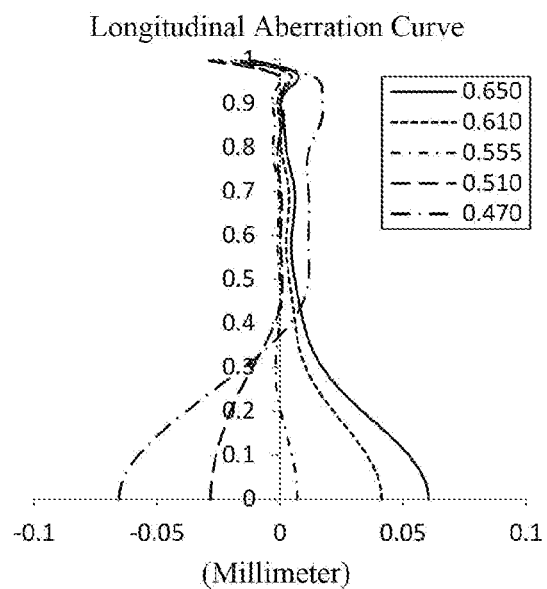
FIGS. 12A to 12C illustrate a longitudinal aberration curve, an astigmatic curve, and a distortion curve of the optical imaging lens assembly of the example 6, respectively.
Figure 12B:
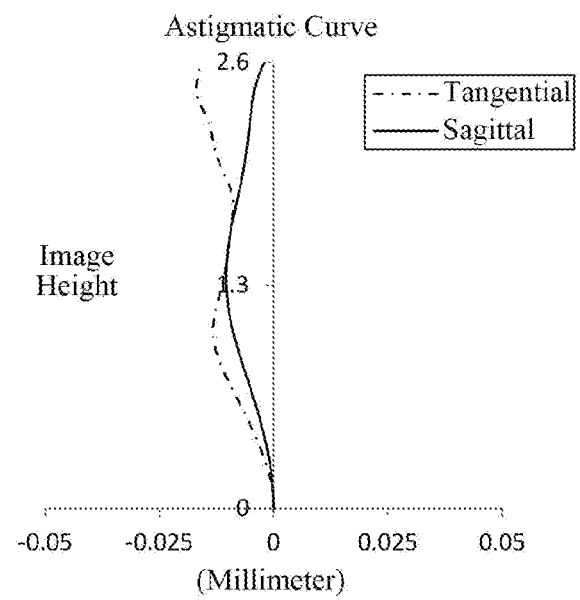
Figure 12C:
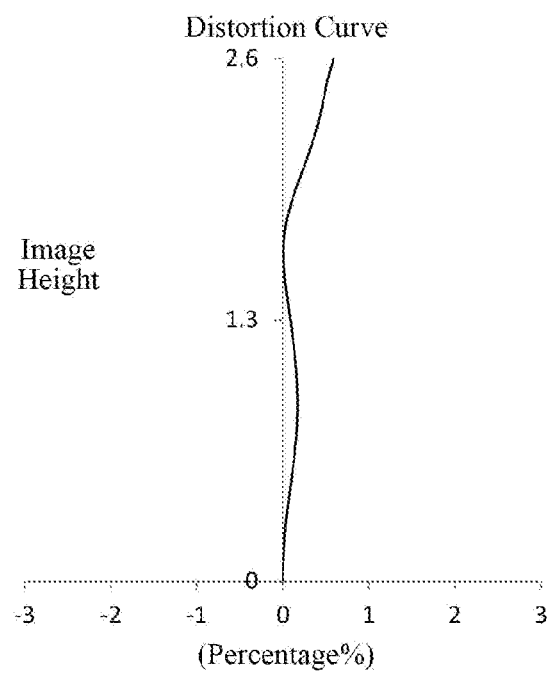

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. It can be seen from FIG. 12A to FIG. 12C that the optical imaging lens assembly provided in example 6 may achieve good image quality.

Example 7

Figure 13:
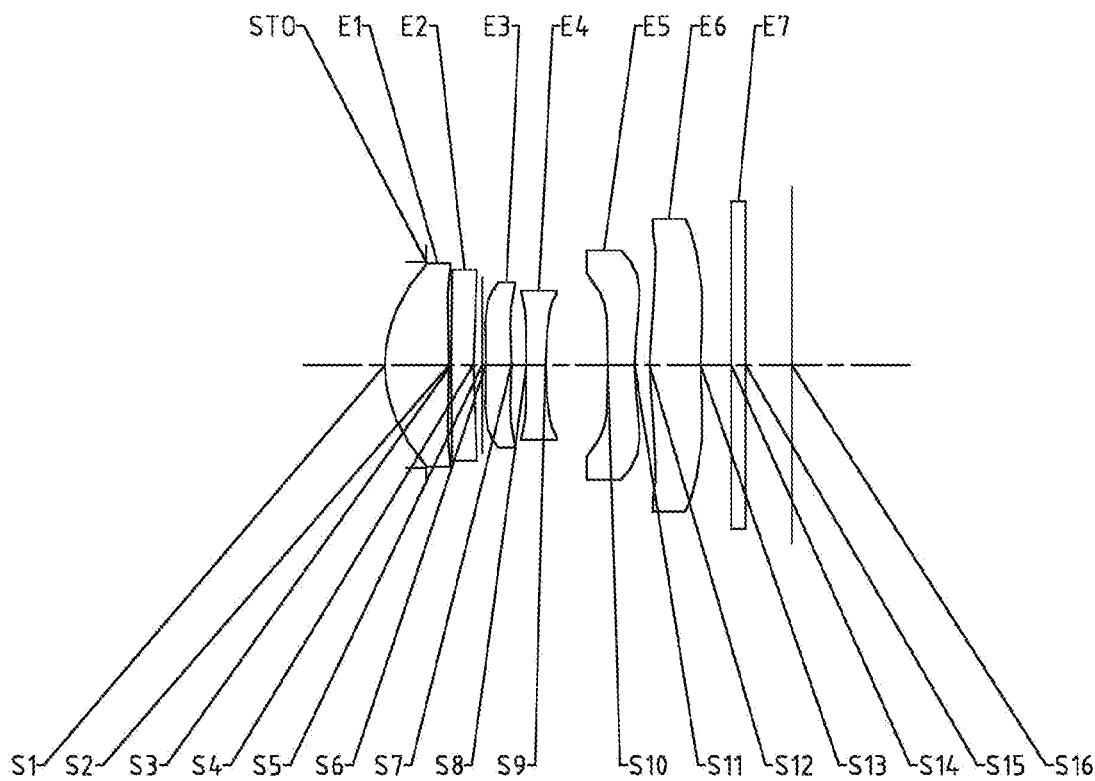
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14C. FIG. 13 shows a schematic structural view of the optical imaging lens assembly according to example 7 of the present disclosure.

As shown in FIG. 13, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is convex. The fourth lens E4 has positive refractive power, an object-side surface S8 thereof is concave, and an image-side surface S9 thereof is concave. The fifth lens E5 has negative refractive power, an object-side surface S10 thereof is concave, and an image-side surface S11 thereof is concave. The sixth lens E6 has positive refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 13 is a table illustrating basic parameters of the optical imaging lens assembly of example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: f = 6.10 mm, TTL = 5.99 mm, ImgH = 2.60 mm, Semi-Fov = 23.0°, Fno = 2.04

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.6089 | | | | |
| S1 | Aspheric | 1.9784 | 0.9415 | 1.55 | 56.1 | 3.54 | −3.9660 |
| S2 | Aspheric | −66.6667 | 0.0300 | | | | 42.8068 |
| S3 | Aspheric | 9.0153 | 0.3300 | 1.68 | 19.2 | 100.00 | −99.0000 |
| S4 | Aspheric | 10.2452 | 0.1271 | | | | −99.0000 |
| S5 | Spherical | Infinite | 0.0547 | | | | |
| S6 | Aspheric | −3.5987 | 0.3786 | 1.55 | 56.1 | −6.59 | −87.6238 |
| S7 | Aspheric | −3.5016 | 0.2180 | | | | −35.6350 |
| S8 | Aspheric | −15.0473 | 0.2790 | 1.68 | 19.2 | 8.90 | 9.4202 |
| S9 | Aspheric | 4.9628 | 0.9177 | | | | 18.8818 |
| S10 | Aspheric | −34.0954 | 0.3938 | 1.55 | 56.1 | −6.47 | −99.0000 |
| S11 | Aspheric | 3.6697 | 0.2199 | | | | −1.8889 |
| S12 | Aspheric | 3.3385 | 0.7492 | 1.68 | 19.2 | 16.44 | −1.9289 |
| S13 | Aspheric | 4.6874 | 0.4525 | | | | −38.0175 |
| S14 | Spherical | Infinite | 0.2100 | 1.52 | 64.2 | | |
| S15 | Spherical | Infinite | 0.6845 | | | | |
| S16 | Spherical | Infinite | | | | | |

TABLE 14

| Surface number | A4 | A6 | A8 |
|---|---|---|---|
| S1 | 5.8414E−02 | −2.3698E−02 | 2.4563E−02 |
| S2 | −1.7231E−01 | 5.2407E−01 | −8.1647E−01 |
| S3 | −1.4850E−01 | 3.8440E−01 | −5.5106E−01 |
| S4 | 8.4835E−02 | −1.2288E−01 | 6.4147E−02 |
| S6 | 2.3165E−01 | −5.3740E−02 | −5.6825E−01 |
| S7 | 3.9119E−01 | −8.6681E−01 | 1.4203E+00 |
| S8 | 2.4490E−01 | −1.1014E+00 | 2.6859E+00 |
| S9 | 8.0591E−02 | −4.3461E−01 | 7.7621E−01 |
| S10 | −1.5024E−02 | −5.0672E−02 | −7.5807E−02 |
| S11 | −1.1252E−01 | 1.2542E−01 | −1.0527E−01 |
| S12 | −1.6462E−01 | 1.2482E−01 | −3.8486E−02 |
| S13 | −7.3899E−02 | 2.4320E−02 | −2.5550E−04 |

| Surface number | A10 | A12 | A14 |
|---|---|---|---|
| S1 | −1.9601E−02 | 6.2625E−03 | 3.5297E−03 |
| S2 | 8.3686E−01 | −6.0736E−01 | 3.2371E−01 |
| S3 | 3.9755E−01 | −1.0243E−01 | −3.4856E−02 |
| S4 | −3.4399E−01 | 8.5332E−01 | −9.0164E−01 |
| S6 | 1.2128E+00 | −1.2501E+00 | 9.0563E−01 |
| S7 | −1.9709E+00 | 2.3369E+00 | −1.9954E+00 |
| S8 | −5.2481E+00 | 7.8148E+00 | −7.9545E+00 |
| S9 | −5.0079E−01 | −8.5534E−01 | 2.6611E+00 |
| S10 | 3.1222E−01 | −6.4927E−01 | 7.6047E−01 |
| S11 | 5.7252E−03 | 5.3300E−02 | −4.4298E−02 |

TABLE 14-continued

| S12 | −1.6772E−02 | 2.1560E−02 | −9.4665E−03 |
| S13 | −4.2683E−03 | 2.1644E−03 | −5.0414E−04 |

| Surface number | A16 | A18 | A20 |
| --- | --- | --- | --- |
| S1 | −4.1889E−03 | 1.5335E−03 | −2.0789E−04 |
| S2 | −1.2191E−01 | 2.8161E−02 | −2.8924E−03 |
| S3 | 2.8058E−02 | −5.7211E−03 | 3.0897E−04 |
| S4 | 4.8415E−01 | −1.3148E−01 | 1.4431E−02 |
| S6 | −5.0549E−01 | 1.8306E−01 | −2.9515E−02 |
| S7 | 1.0941E+00 | −3.4634E−01 | 4.7256E−02 |
| S8 | 5.0962E+00 | −1.8430E+00 | 2.8525E−01 |
| S9 | −3.0896E+00 | 1.7561E+00 | −4.0236E−01 |
| S10 | −5.0141E−01 | 1.7353E−01 | −2.4318E−02 |
| S11 | 1.7301E−02 | −3.4849E−03 | 2.9206E−04 |
| S12 | 2.2159E−03 | −2.7649E−04 | 1.4487E−05 |
| S13 | 5.8444E−05 | −3.0330E−06 | 4.0624E−08 |

Figures 14A, 14B:
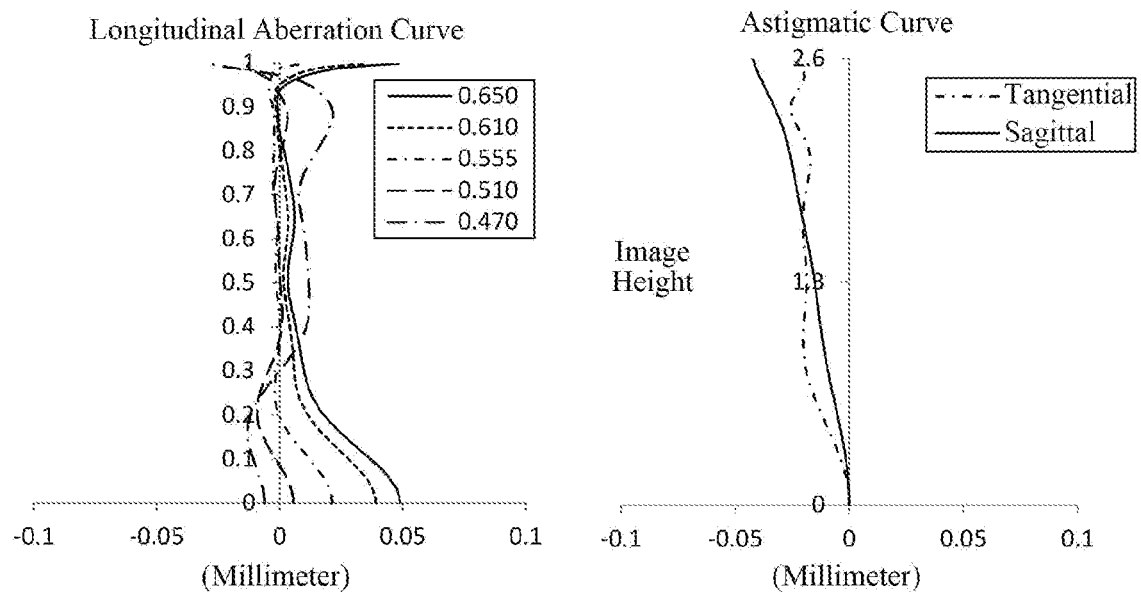
FIGS. 14A to 14C illustrate a longitudinal aberration curve, an astigmatic curve, and a distortion curve of the optical imaging lens assembly of the example 7, respectively.
Figure 14C:
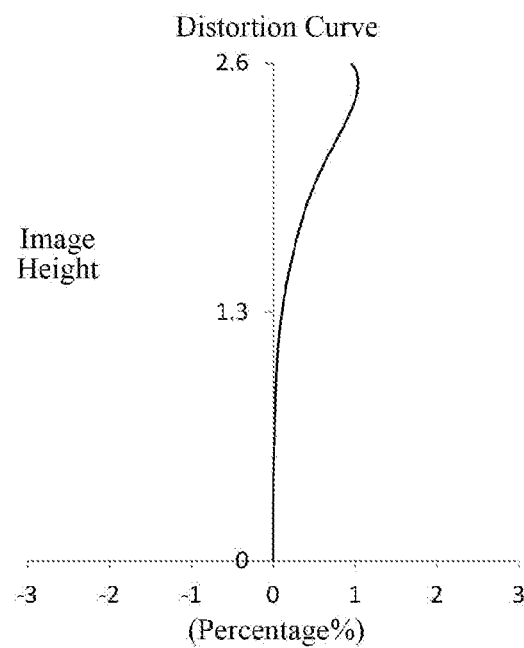

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. It can be seen from FIG. 14A to FIG. 14C that the optical imaging lens assembly provided in example 7 may achieve good image quality.

Example 8

Figure 15:
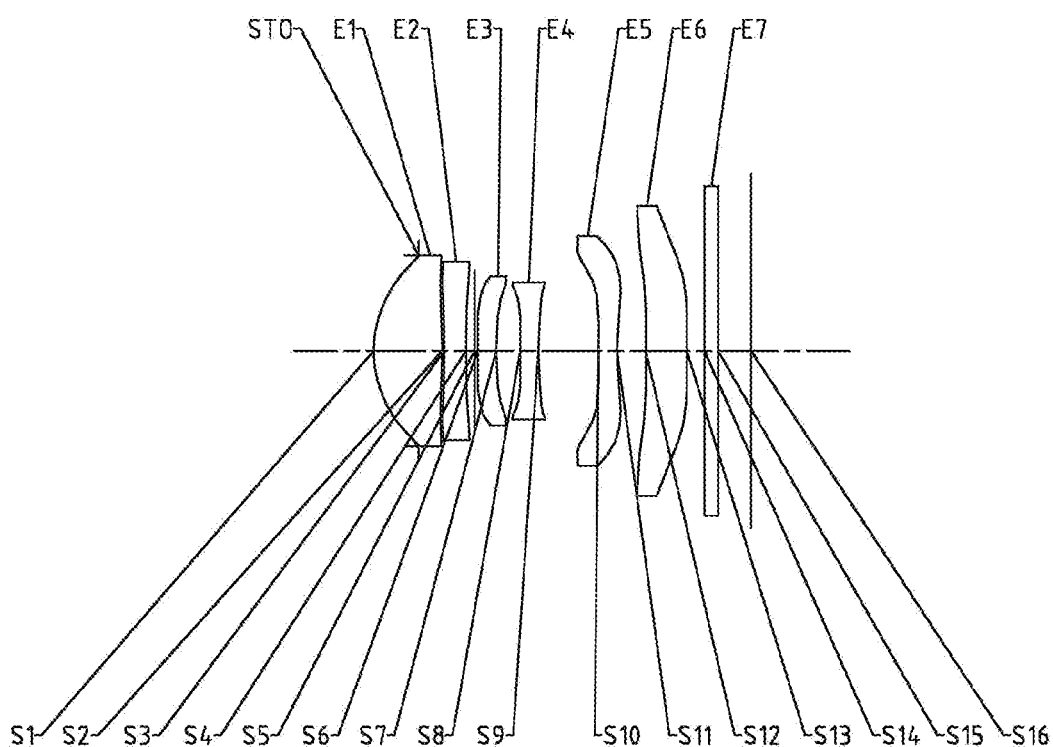
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16C. FIG. 15 shows a schematic structural view of the optical imaging lens assembly according to example 8 of the present disclosure.

As shown in FIG. 15, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 15 is a table illustrating basic parameters of the optical imaging lens assembly of example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

Example 8: f = 6.31 mm, TTL = 5.78 mm, ImgH = 2.72 mm, Semi-Fov = 23.3°, Fno = 2.15

| Surface number | Surface type | Radius of curvature | Thickness | Material Refractive index | Material Abbe number | Focal length | Conic coefficient |
| --- | --- | --- | --- | --- | --- | --- | --- |
| OBJ | Spherical | Infinite | Infinite | | | | |
| STO | Spherical | Infinite | −0.6873 | | | | |
| S1 | Aspheric | 1.7870 | 1.0531 | 1.55 | 56.1 | 3.21 | −3.2011 |
| S2 | Aspheric | −66.6667 | 0.0301 | | | | −99.0000 |
| S3 | Aspheric | 35.4319 | 0.3300 | 1.68 | 19.2 | 100.00 | 44.6745 |
| S4 | Aspheric | 73.9938 | 0.1332 | | | | 50.0000 |
| S5 | Spherical | Infinite | 0.0509 | | | | |
| S6 | Aspheric | −4.3650 | 0.2790 | 1.55 | 56.1 | −8.00 | −97.4772 |
| S7 | Aspheric | 33.0431 | 0.3681 | | | | −99.0000 |
| S8 | Aspheric | 14.1110 | 0.2790 | 1.68 | 19.2 | 31.46 | −99.0000 |
| S9 | Aspheric | 5.1137 | 0.9232 | | | | 19.4485 |
| S10 | Aspheric | 15.0485 | 0.2790 | 1.55 | 56.1 | −10.90 | −16.6663 |
| S11 | Aspheric | 3.6347 | 0.4434 | | | | −2.9279 |
| S12 | Aspheric | 17.7927 | 0.6275 | 1.68 | 19.2 | −9.13 | 31.2863 |
| S13 | Aspheric | 13.8913 | 0.2715 | | | | −99.0000 |
| S14 | Spherical | Infinite | 0.2100 | 1.52, | 64.2 | | |
| S15 | Spherical | Infinite | 0.5017 | | | | |
| S16 | Spherical | Infinite | | | | | |

TABLE 16

| Surface number | A4 | A6 | A8 |
|---|---|---|---|
| S1 | 6.9616E−02 | −4.7527E−02 | 1.1776E−01 |
| S2 | −4.1451E−01 | 1.6098E+00 | −3.4885E+00 |
| S3 | −4.1652E−01 | 1.5846E+00 | −3.4780E+00 |
| S4 | 1.0147E−02 | 3.4711E−01 | −1.1913E+00 |
| S6 | 3.4949E−01 | −2.8231E−01 | −4.0676E−01 |
| S7 | 3.7345E−01 | −5.9242E−01 | 6.4086E−02 |
| S8 | −4.9246E−02 | −3.9916E−01 | 1.1630E+00 |
| S9 | −4.7571E−02 | −2.1259E−01 | 7.5575E−01 |
| S10 | −9.8254E−02 | 4.2103E−02 | −6.5044E−02 |
| S11 | −1.1389E−01 | 1.2496E−01 | −1.8383E−01 |
| S12 | −9.6367E−02 | 7.6964E−02 | −4.4469E−02 |
| S13 | −9.5980E−02 | 4.9461E−02 | −2.7690E−02 |

| Surface number | A10 | A12 | A14 |
|---|---|---|---|
| S1 | −2.1233E−01 | 2.4402E−01 | −1.7511E−01 |
| S2 | 5.0071E+00 | −4.8738E+00 | 3.1695E+00 |
| S3 | 5.0019E+00 | −4.8728E+00 | 3.1920E+00 |
| S4 | 1.9378E+00 | −1.9083E+00 | 1.2466E+00 |
| S6 | 1.6344E+00 | −2.5877E+00 | 2.6783E+00 |
| S7 | 2.2775E+00 | −6.5783E+00 | 1.0343E+01 |
| S8 | −3.1019E+00 | 5.9355E+00 | −7.1203E+00 |
| S9 | −2.0767E+00 | 4.2796E+00 | −5.6061E+00 |
| S10 | −2.0367E−02 | 1.2091E−01 | −1.2384E−01 |
| S11 | 1.5918E−01 | −8.5177E−02 | 2.7547E−02 |
| S12 | 1.8253E−02 | −5.9595E−03 | 1.7486E−03 |
| S13 | 1.2619E−02 | −4.0244E−03 | 8.3915E−04 |

| Surface number | A16 | A18 | A20 |
|---|---|---|---|
| S1 | 7.6060E−02 | −1.8301E−02 | 1.8654E−03 |
| S2 | −1.3120E+00 | 3.1065E−01 | −3.1820E−02 |
| S3 | −1.3417E+00 | 3.2498E−01 | −3.4265E−02 |
| S4 | −5.4318E−01 | 1.4337E−01 | −1.7152E−02 |
| S6 | −1.8294E+00 | 7.3166E−01 | −1.2792E−01 |
| S7 | −9.6829E+00 | 5.0425E+00 | −1.1276E+00 |
| S8 | 5.0641E+00 | −1.9165E+00 | 2.7677E−01 |
| S9 | 4.4310E+00 | −1.9227E+00 | 3.4814E−01 |
| S10 | 6.2073E−02 | −1.5530E−02 | 1.5380E−03 |
| S11 | −4.8004E−03 | 2.9629E−04 | 1.2332E−05 |
| S12 | −3.9288E−04 | 5.1945E−05 | −2.9065E−06 |
| S13 | −9.7609E−05 | 4.3862E−06 | 3.9502E−08 |

Figure 16A:
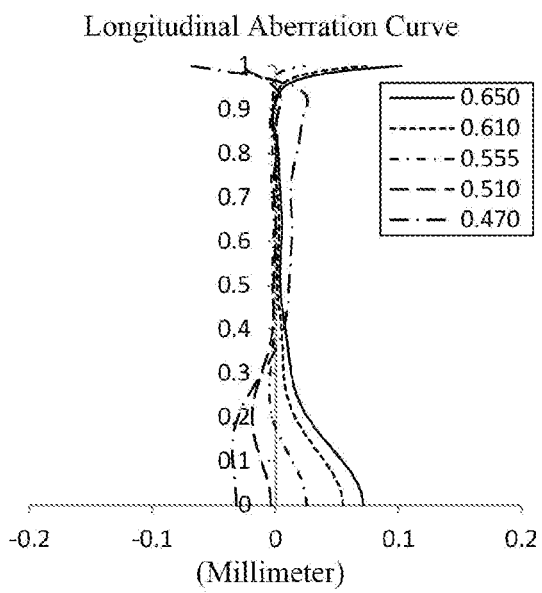
FIGS. 16A to 16C illustrate a longitudinal aberration curve, an astigmatic curve, and a distortion curve of the optical imaging lens assembly of the example 8, respectively.
Figure 16B:
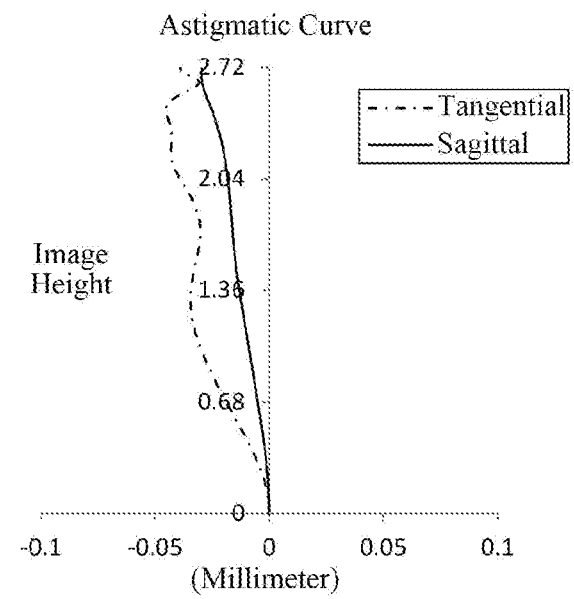
Figure 16C:
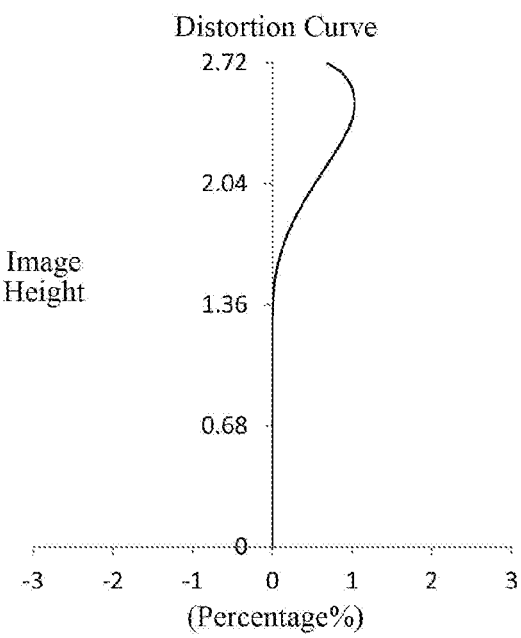

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. It can be seen from FIG. 16A to FIG. 16C that the optical imaging lens assembly provided in example 8 may achieve good image quality.

Example 9

Figure 17:
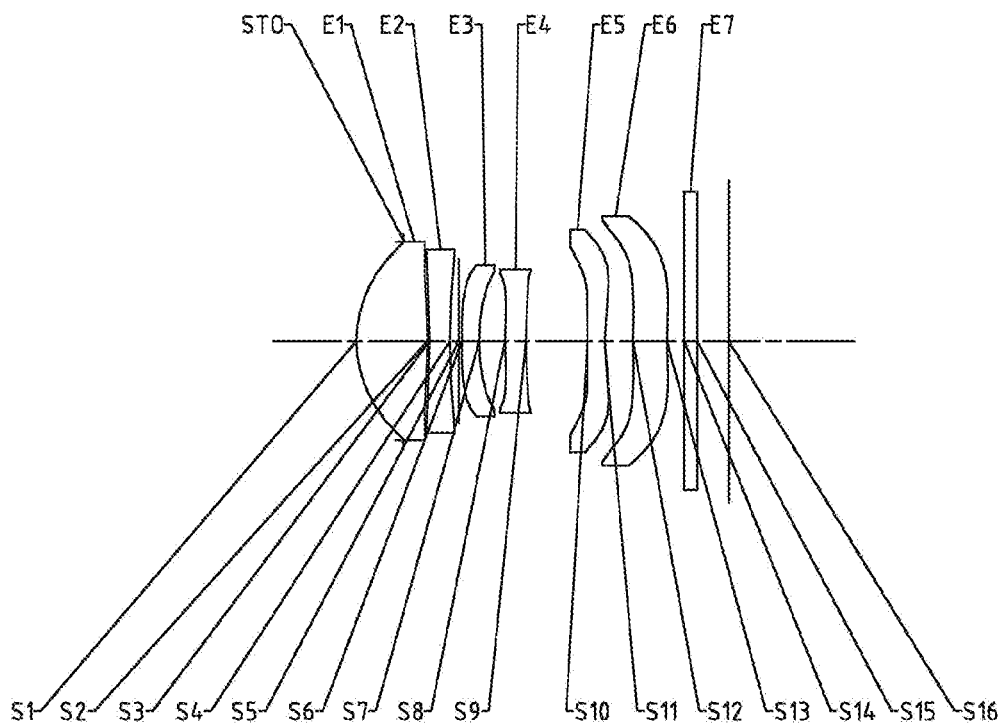
FIG. 17 illustrates a schematic structural view of an optical imaging lens assembly according to example 9 of the present disclosure.

An optical imaging lens assembly according to example 9 of the present disclosure is described below with reference to FIG. 17 to FIG. 18C. FIG. 17 shows a schematic structural view of the optical imaging lens assembly according to example 9 of the present disclosure.

As shown in FIG. 17, the optical imaging lens assembly includes a first lens E1, a second lens E2, a third lens E3, a fourth lens E4, a fifth lens E5, a sixth lens E6, an optical filter E7 and an imaging plane S16, which are sequentially arranged from an object side to an image side along an optical axis.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has negative refractive power, an object-side surface S6 thereof is concave, and an image-side surface S7 thereof is concave. The fourth lens E4 has positive refractive power, an object-side surface S8 thereof is convex, and an image-side surface S9 thereof is concave. The fifth lens E5 has negative refractive power, an object-side surface S10 thereof is convex, and an image-side surface S11 thereof is concave. The sixth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on the imaging plane S16.

In the optical imaging lens assembly of this example, a stop STO for limiting the aperture of the light beam may be disposed between the object side and the first lens E1 to improve the image quality. Optionally, the optical imaging lens assembly of this example may further include a dummy spacer S5 disposed between the second lens E2 and the third lens E3.

Table 17 is a table illustrating basic parameters of the optical imaging lens assembly of example 9, wherein the units for the radius of curvature, the thickness and the focal length are millimeter (mm). Table 18 shows high-order coefficients applicable to each aspheric surface in example 9, wherein the surface shape of each aspheric surface may be defined by the formula (1) given in the above example 1.

TABLE 17

Example 9: f = 6.25 mm, TTL = 6.00 mm, ImgH = 2.60 mm, Semi-Fov = 22.5°, Fno = 1.95

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7532 | | | | |
| S1 | Aspheric | 1.9581 | 1.1479 | 1.55 | 56.1 | 3.48 | −3.7020 |
| S2 | Aspheric | −49.2280 | 0.0296 | | | | 50.0000 |
| S3 | Aspheric | 40.8658 | 0.3300 | 1.68 | 19.2 | 111.11 | −79.0953 |
| S4 | Aspheric | 89.0986 | 0.1459 | | | | 38.2330 |
| S5 | Spherical | Infinite | 0.0480 | | | | |
| S6 | Aspheric | −7.3508 | 0.2790 | 1.55 | 56.1 | −13.46 | −81.1700 |
| S7 | Aspheric | 5.0831 | 0.4122 | | | | −99.0000 |

TABLE 17-continued

Example 9: f = 6.25 mm, TTL = 6.00 mm, ImgH = 2.60 mm, Semi-Fov = 22.5°, Fno = 1.95

| Surface number | Surface type | Radius of curvature | Thickness | Material Refractive index | Abbe number | Focal length | Conic coefficient |
|---|---|---|---|---|---|---|---|
| S8  | Aspheric  | 5.8133   | 0.3368 | 1.68 | 19.2 | 69.89  | 23.3924  |
| S9  | Aspheric  | 6.0957   | 0.9937 |      |      |        | 20.6408  |
| S10 | Aspheric  | 11.4585  | 0.2790 | 1.55 | 56.1 | −17.17 | 8.6488   |
| S11 | Aspheric  | 3.3779   | 0.4551 |      |      |        | −3.4163  |
| S12 | Aspheric  | 7.5801   | 0.5487 | 1.68 | 19.2 | −15.23 | −21.7056 |
| S13 | Aspheric  | 6.6515   | 0.2756 |      |      |        | −77.6851 |
| S14 | Spherical | Infinite | 0.2100 | 1.52 | 64.2 |        |          |
| S15 | Spherical | Infinite | 0.5087 |      |      |        |          |
| S16 | Spherical | Infinite |        |      |      |        |          |

TABLE 18

| Surface number | A4 | A6 | A8 |
|---|---|---|---|
| S1  | 6.0097E−02  | −3.0927E−02 | 5.2066E−02  |
| S2  | −3.9095E−01 | 1.2237E+00  | −2.1611E+00 |
| S3  | −3.6966E−01 | 1.1497E+00  | −2.0800E+00 |
| S4  | 6.6997E−02  | 6.0548E−02  | −4.0918E−01 |
| S6  | 4.0560E−01  | −6.9837E−01 | 9.1809E−01  |
| S7  | 3.4703E−01  | −6.8601E−01 | 7.7796E−01  |
| S8  | −9.5276E−02 | −1.5515E−01 | 2.3925E−01  |
| S9  | −5.7206E−02 | −7.3355E−02 | 1.5512E−01  |
| S10 | −8.2360E−02 | −8.9327E−03 | 3.6929E−03  |
| S11 | −9.6084E−02 | 4.5590E−02  | −5.3587E−02 |
| S12 | −1.0558E−01 | 6.2523E−02  | −3.6152E−02 |
| S13 | −8.6315E−02 | 3.1789E−02  | −1.3920E−02 |

| Surface number | A10 | A12 | A14 |
|---|---|---|---|
| S1  | −7.2993E−02 | 6.7871E−02  | −3.9784E−02 |
| S2  | 2.5300E+00  | −1.9999E+00 | 1.0493E+00  |
| S3  | 2.4856E+00  | −2.0107E+00 | 1.0861E+00  |
| S4  | 7.4223E−01  | −7.8387E−01 | 5.3988E−01  |
| S6  | −8.8144E−01 | 6.1853E−01  | −2.5452E−01 |
| S7  | 5.6111E−02  | −1.8446E+00 | 3.3041E+00  |
| S8  | −2.1783E−01 | −1.7833E−01 | 9.2196E−01  |
| S9  | −2.1878E−01 | 3.1253E−01  | −3.0404E−01 |
| S10 | 6.7067E−03  | −1.4837E−02 | 1.5838E−02  |
| S11 | 4.7084E−02  | −3.0466E−02 | 1.3198E−02  |
| S12 | 1.6078E−02  | −5.6877E−03 | 8.0739E−04  |
| S13 | 5.0492E−03  | −1.5081E−03 | 2.8439E−04  |

TABLE 18-continued

| Surface number | A16 | A18 | A20 |
|---|---|---|---|
| S1  | 1.4149E−02  | −2.7857E−03 | 2.3183E−04  |
| S2  | −3.4845E−01 | 6.5939E−02  | −5.3865E−03 |
| S3  | −3.7368E−01 | 7.3688E−02  | −6.3063E−03 |
| S4  | −2.3893E−01 | 6.1090E−02  | −6.7874E−03 |
| S6  | 2.8193E−02  | 1.7201E−02  | −4.9736E−03 |
| S7  | −2.9579E+00 | 1.3946E+00  | −2.7762E−01 |
| S8  | −1.2219E+00 | 7.3792E−01  | −1.7796E−01 |
| S9  | 1.9069E−01  | −7.2496E−02 | 1.2447E−02  |
| S10 | −8.2900E−03 | 2.1014E−03  | −2.0709E−04 |
| S11 | −3.5121E−03 | 5.1221E−04  | −3.0743E−05 |
| S12 | 1.7939E−04  | −6.8549E−05 | 5.7542E−06  |
| S13 | −2.6163E−05 | 6.7573E−07  | 3.6387E−08  |

Figure 18A:
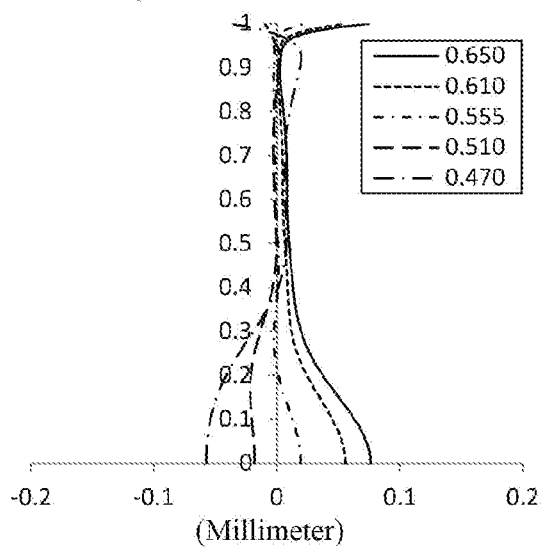
FIGS. 18A to 18C illustrate a longitudinal aberration curve, an astigmatic curve, and a distortion curve of the optical imaging lens assembly of the example 9, respectively.
Figure 18B:
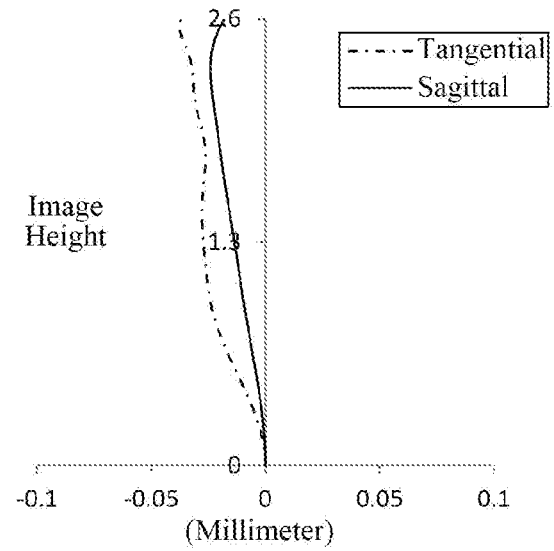
Figure 18C:
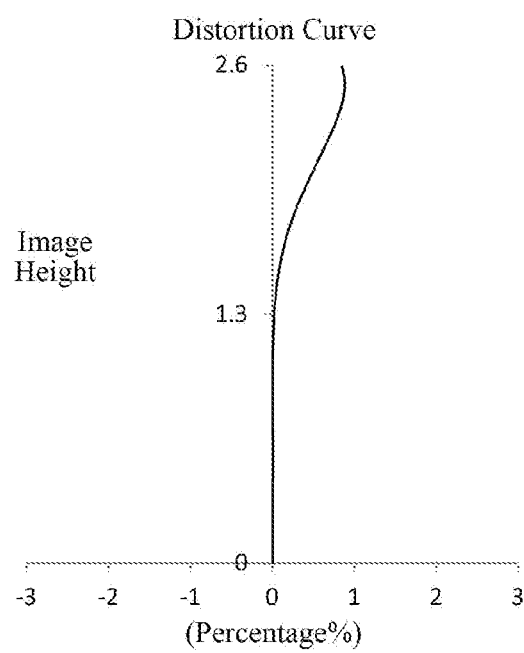

FIG. 18A illustrates a longitudinal aberration curve of the optical imaging lens assembly according to example 9, representing deviations of focal points converged by light of different wavelengths after passing through the lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion corresponding to different image heights. It can be seen from FIG. 18A to FIG. 18C that the optical imaging lens assembly provided in example 9 may achieve good image quality.

In view of the above, examples 1 to 9 respectively satisfy the relationship shown in Table 19.

TABLE 19

| Condition/Example | 1 | 2 | 3 | 4 | 5 | 6 | 7 | 8 | 9 |
|---|---|---|---|---|---|---|---|---|---|
| TTL/f             | 0.98 | 0.93 | 0.89 | 0.98 | 0.98 | 0.98 | 0.98 | 0.92 | 0.96 |
| tan(Semi-Fov)*f1(mm) | 1.37 | 1.31 | 1.22 | 1.43 | 1.45 | 1.45 | 1.50 | 1.38 | 1.44 |
| (R2 + R5)/f3      | 3.41 | 9.95 | 8.93 | 6.23 | 5.88 | 2.66 | 10.66 | 8.88 | 4.20 |
| f/R1              | 3.20 | 3.54 | 3.83 | 3.19 | 3.15 | 3.09 | 3.08 | 3.53 | 3.19 |
| (R8 + R10)/f      | 1.34 | 1.27 | 1.23 | 1.22 | 1.51 | 1.94 | 1.42 | 1.39 | 1.52 |
| CT1/CT6           | 1.76 | 1.58 | 1.34 | 1.66 | 2.15 | 2.51 | 1.26 | 1.68 | 2.09 |
| T45/T34           | 2.09 | 2.57 | 2.82 | 1.92 | 2.30 | 2.29 | 4.21 | 2.51 | 2.41 |
| T56/CT5           | 1.04 | 1.84 | 1.88 | 1.88 | 2.08 | 1.24 | 0.56 | 1.59 | 1.63 |
| f2/(|R3 + R9|)    | 2.16 | 2.75 | 3.03 | 2.34 | 2.38 | 2.09 | 3.99 | 1.98 | 2.12 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens and a sixth lens, which are sequentially arranged from an object side to an image side of the optical imaging lens assembly along an optical axis, and each of the first to the sixth lenses having refractive power,
   the second lens having positive refractive power;
   an image-side surface of the fourth lens being concave, wherein $2.5<(R2+R5)/f3<11.0$, and $$1.0<(R8+R10)/f<2.0,$$

where R2 is a radius of curvature of an image-side surface of the first lens, R5 is a radius of curvature of an object-side surface of the third lens, R8 is a radius of curvature of the image-side surface of the fourth lens, R10 is a radius of curvature of an image-side surface of the fifth lens, f is a total effective focal length of the optical imaging lens assembly, and f3 is an effective focal length of the third lens.

2. The optical imaging lens assembly according to claim 1, wherein $TTL/f<1$,
   where TTL is a distance along the optical axis from an object-side surface of the first lens to an imaging plane of the optical imaging lens assembly, and f is a total effective focal length of the optical imaging lens assembly.

3. The optical imaging lens assembly according to claim 1, wherein $1.0\ mm<\tan(Semi\text{-}Fov)*f1<1.6\ mm$,
   where Semi-Fov is half of a maximum field-of-view of the optical imaging lens assembly, and f1 is an effective focal length of the first lens.

4. The optical imaging lens assembly according to claim 1, wherein an object-side surface of the second lens is convex, and an image-side surface of the second lens is concave.

5. The optical imaging lens assembly according to claim 1, wherein $3.0<f/R1<4.0$,
   where f is a total effective focal length of the optical imaging lens assembly, and R1 is a radius of curvature of an object-side surface of the first lens.

6. The optical imaging lens assembly according to claim 1, wherein $1.0<CT1/CT6<3.0$,
   where CT1 is a center thickness of the first lens along the optical axis, and CT6 is a center thickness of the sixth lens along the optical axis.

7. The optical imaging lens assembly according to claim 1, wherein $1.5<T45/T34<4.5$,
   where T34 is an air interval between the third lens and the fourth lens along the optical axis, and T45 is an air interval between the fourth lens and the fifth lens along the optical axis.

8. The optical imaging lens assembly according to claim 1, wherein $0.5<T56/CT5<2.5$,
   where CT5 is a center thickness of the fifth lens along the optical axis, and T56 is an air interval between the fifth lens and the sixth lens along the optical axis.

9. The optical imaging lens assembly according to claim 1, wherein $1.5<f2/(|R3+R9|)<4.0$,
   where f2 is an effective focal length of the second lens, R3 is a radius of curvature of an object-side surface of the second lens, and R9 is a radius of curvature of an object-side surface of the fifth lens.

10. The optical imaging lens assembly according to claim 1, wherein an object-side surface of the first lens is convex, and the image-side surface of the first lens is convex.

11. The optical imaging lens assembly according to claim 1, wherein an object-side surface of the sixth lens is convex, and an image-side surface of the sixth lens is concave.

12. An optical imaging lens assembly, comprising: a first lens, a second lens, a third lens, a fourth lens, a fifth lens and a sixth lens, which are sequentially arranged from an object side to an image side of the optical imaging lens assembly along an optical axis, and each of the first to the sixth lenses having refractive power,
    an image-side surface of the fourth lens being concave, wherein $TTL/f<1$, and $$1.0<(R8+R10)/f<2.0,$$

where TTL is a distance along the optical axis from an object-side surface of the first lens to an imaging plane of the optical imaging lens assembly, R8 is a radius of curvature of the image-side surface of the fourth lens, R10 is a radius of curvature of an image-side surface of the fifth lens, and f is a total effective focal length of the optical imaging lens assembly.

13. The optical imaging lens assembly according to claim 12, wherein $1.0\ mm<\tan(Semi\text{-}Fov)*f1<1.6\ mm$,
    where Semi-Fov is half of a maximum field-of-view of the optical imaging lens assembly, and f1 is an effective focal length of the first lens.

14. The optical imaging lens assembly according to claim 12, wherein the second lens has positive refractive power, an object-side surface of the second lens is convex, and an image-side surface of the second lens is concave.

15. The optical imaging lens assembly according to claim 12, wherein $3.0<f/R1<4.0$,
    where f is the total effective focal length of the optical imaging lens assembly, and R1 is a radius of curvature of the object-side surface of the first lens.

16. The optical imaging lens assembly according to claim 12, wherein $1.0<CT1/CT6<3.0$,
    where CT1 is a center thickness of the first lens along the optical axis, and CT6 is a center thickness of the sixth lens along the optical axis.

17. The optical imaging lens assembly according to claim 12, wherein $1.5<T45/T34<4.5$,
    where T34 is an air interval between the third lens and the fourth lens along the optical axis, and T45 is an air interval between the fourth lens and the fifth lens along the optical axis.

18. The optical imaging lens assembly according to claim 12, wherein $1.5<f2/(|R3+R9|)<4.0$, where f2 is an effective focal length of the second lens, R3 is a radius of curvature of an object-side surface of the second lens, and R9 is a radius of curvature of an object-side surface of the fifth lens.

* * * * *